(12) United States Patent
Gillet

(10) Patent No.: US 7,668,202 B2
(45) Date of Patent: Feb. 23, 2010

(54) COMMUNICATIONS BUS HAVING LOW LATENCY INTERRUPTS AND CONTROL SIGNALS, HOTPLUGGABILITY ERROR DETECTION AND RECOVERY, BANDWIDTH ALLOCATION, NETWORK INTEGRITY VERIFICATION, PROTOCOL TUNNELING AND DISCOVERABILITY FEATURES

(75) Inventor: Michel Gillet, Helsinki (FI)

(73) Assignee: Nokia Corporation, Espoo (FI)

( * ) Notice: Subject to any disclaimer, the term of this patent is extended or adjusted under 35 U.S.C. 154(b) by 831 days.

(21) Appl. No.: 10/961,366

(22) Filed: Oct. 7, 2004

(65) Prior Publication Data

US 2005/0111490 A1 May 26, 2005

Related U.S. Application Data

(60) Provisional application No. 60/510,681, filed on Oct. 10, 2003.

(51) Int. Cl.
*H04J 3/16* (2006.01)
(52) U.S. Cl. .................................. 370/469; 370/471
(58) Field of Classification Search .............. 370/468, 370/469, 489, 537, 431, 464, 471, 473
See application file for complete search history.

(56) References Cited

U.S. PATENT DOCUMENTS

| 5,764,915 | A | * | 6/1998 | Heimsoth et al. | 709/227 |
|---|---|---|---|---|---|
| 6,091,729 | A | | 7/2000 | Dove | 370/395 |
| 6,651,104 | B1 | * | 11/2003 | Moon | 709/238 |
| 6,973,037 | B1 | * | 12/2005 | Kahveci | 370/236 |
| 2002/0018473 | A1 | | 2/2002 | Hassell et al. | 370/395.1 |
| 2002/0073261 | A1 | | 6/2002 | Kosaraju | 710/240 |
| 2003/0072264 | A1 | | 4/2003 | Mo et al. | 370/235 |

OTHER PUBLICATIONS

"Resource Deadlocks and Performance of Wormhole Multicast Routing Algorithms", Rajendra V. Boppana, IEEE Transactions On Parallel And Distributed Systems, vol. 9, No. 6, Jun. 1998, pp. 535-549.
"Unicast Message Routing In Communication Networks With Irregular Topology", Lev Zakrevski et al., 7 pages.

* cited by examiner

*Primary Examiner*—Brenda Pham
(74) *Attorney, Agent, or Firm*—Harrington & Smith, PC

(57) ABSTRACT

Disclosed are methods and apparatus to control data and command flow over a physical communications channel between a transmitter and a receiver, and more specifically to provide a protocol for a point-to-point serial bus architecture with low latency time for flow control and other signaling, regardless of the length of the data packet frame. The abstract data flow control protocol can be employed by various buses as it interacts only with the lowest protocol layers. Separate buffers for data and control can be used to allow the bus to be compatible with slower buses also to support additional control functions without involving a higher protocol layer.

29 Claims, 13 Drawing Sheets

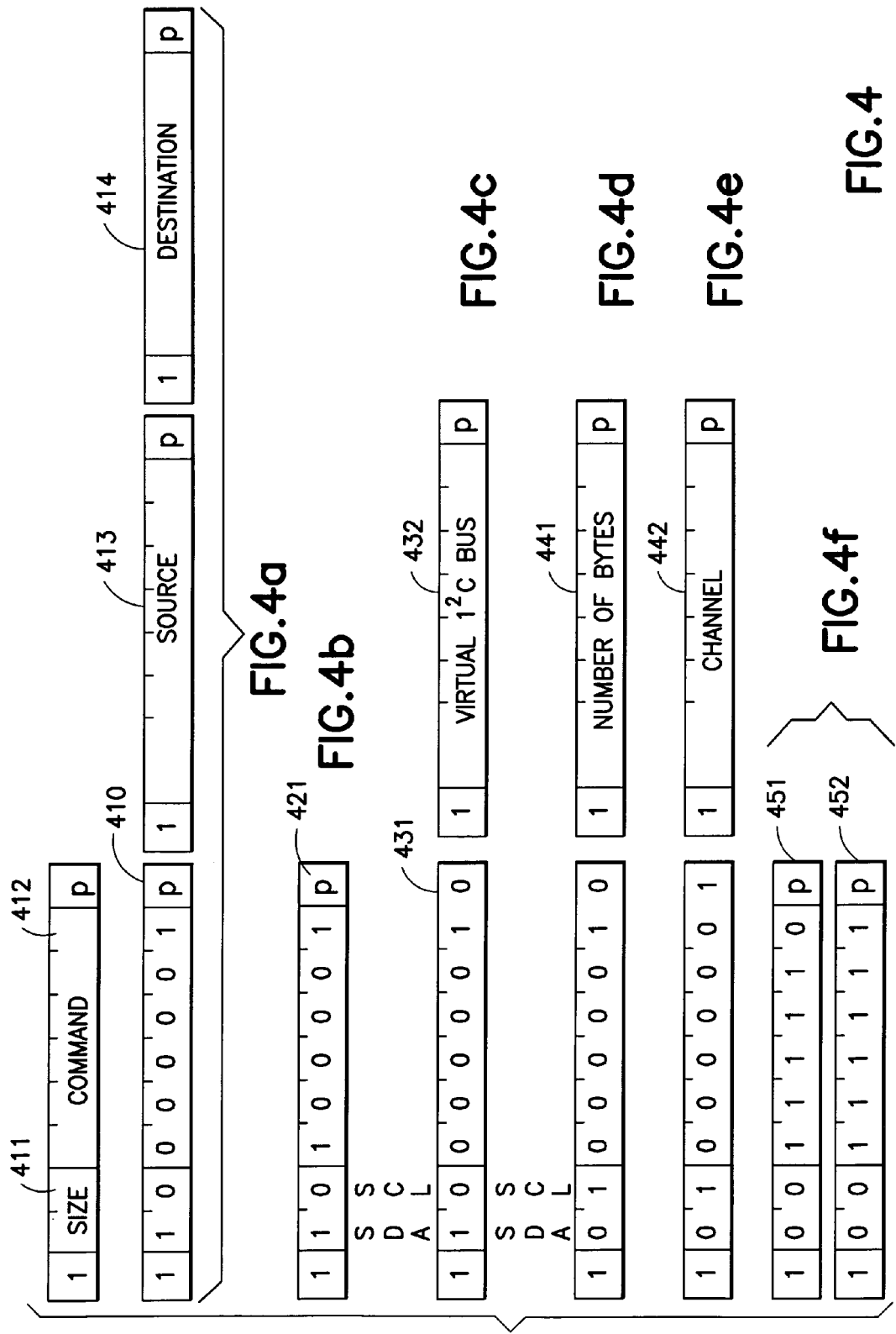

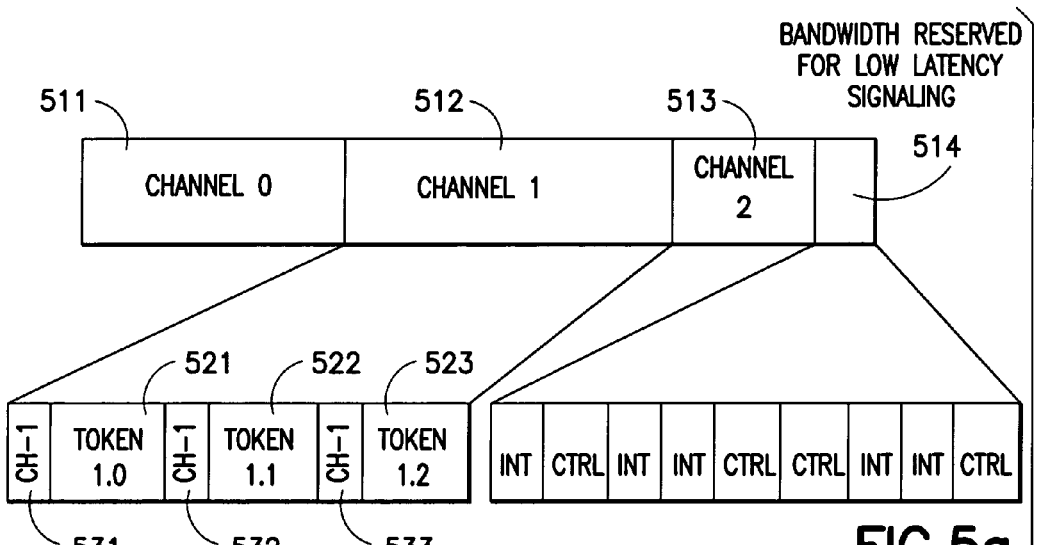
FIG.5a
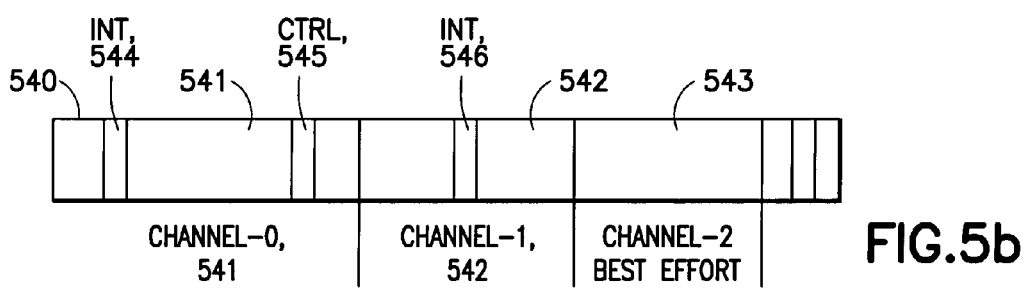
FIG.5b
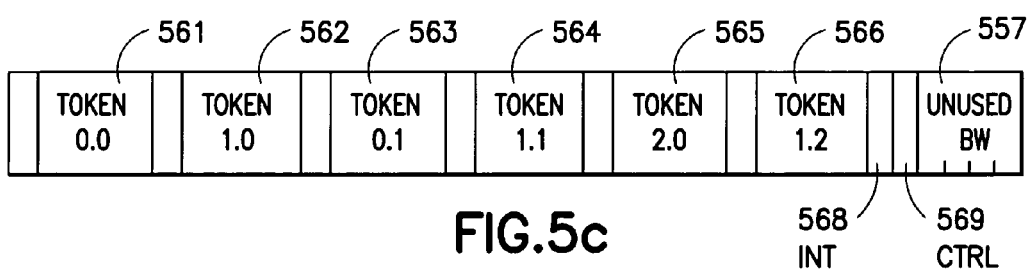
FIG.5c
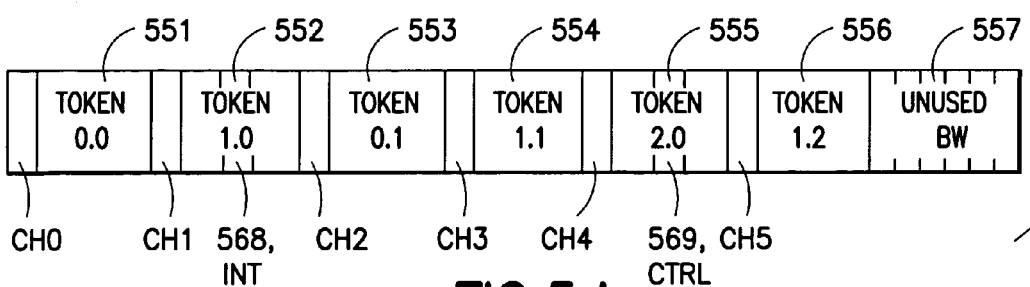
FIG.5d
FIG.5

| TYPICAL IP ROUTING TABLE | |
|---|---|
| IP | INTERFACE/ROUTER |
| 192.168.0.1 | ETHERNET2 |
| 192.168.255.254 | |
| 192.168.168.0* | 192.168.0.254 |

FIG.7a

| TYPICAL MVHSS_BUS ROUTING TABLE | |
|---|---|
| MVHSS_BUS ADDRESS | PORT |
| 2 | 0 |
| 7 | 1 |
| 10-25 | 3 |

COMMUNICATIONS BUS HAVING LOW LATENCY INTERRUPTS AND CONTROL SIGNALS, HOTPLUGGABILITY ERROR DETECTION AND RECOVERY, BANDWIDTH ALLOCATION, NETWORK INTEGRITY VERIFICATION, PROTOCOL TUNNELING AND DISCOVERABILITY FEATURES

CLAIM OF PRIORITY FROM COPENDING PROVISIONAL PATENT APPLICATION

This patent application claims priority under 35 U.S.C. §119(e) from Provisional Patent Application No. 60/510,681, filed Oct. 10, 2003, the disclosure of which is incorporated by reference herein in its entirety.

TECHNICAL FIELD

This invention pertains to the control of data and command flow over a physical communications channel between a transmitter and a receiver and, more specifically, relates to a protocol for a point-to-point bus architecture with low latency time for flow control and other signaling, regardless of the length of a data packet frame.

BACKGROUND

Typical data processor bus system configurations are too slow and cumbersome when used for System on a Chip (SoC) type architecture communications, especially when multiple data streams are simultaneously required. Conventional parallel buses would provide the data transfer capability, but they are prone to skew errors, while conventional serial buses require clocking, either hardwired or regenerated. Another possibility is to use multilevel signaling. Multilevel buses can be used in such a way that the transmitted amplitude is changed, even if the same symbol is sent at consecutive bit periods, in order to provide an inherent clocking signal. This signaling method is, however, presently used more to provide scalable asynchronous bit rates from zero to very high values, rather than to increase the information content. As may be appreciated, the applicability of a serial multilevel bus, and other bus types, is enhanced if fast, low latency signaling could be used without hardwired control signals, or the use of short packets.

A communication link is conventionally depicted as a layered model, as exemplified by FIG. 1, which shows how the information is packaged at the different protocol layers between a sending process 101 and a receiving process 102. Header information is added at each higher level. For example, an Application Header (AH) is added at the Application layer, a Presentation Header (PH) is added at the Presentation layer, and so on. While actual transmission takes place only at the physical layer 100, each receiver layer is conceptually in contact with the matching transmitting layer, and can conceptually signal at the same level using a reverse channel.

In reality, each layer only communicates with the layer above or below it, and adds respective header 103, 104 information during the process. What can be observed is that the use of any higher layer for flow control increases the response time, because of the additional header(s) 103. Note that usually a data termination header 106 is inserted at the datalink level, but this can be omitted by including the size of the frame in the header 104 itself, or specifying that the next header is considered to be the data termination.

Regardless of the electrical interface method, serial or parallel, asynchronous or synchronous, with a separate clock line or with a regenerated clock signal, a system constraint when using the same layer for flow control signaling is the latency time. In conventional serial links the latency time is to a great extent directly related to the information packet frame length on the lowest protocol levels. A short frame length can provide the needed short latency time, because handshaking or interrupt signaling is not required to wait for a previous long frame to end. One solution would be to discard any long frame undergoing transmission in the middle of the frame, and to then send a new short frame containing the low latency signal. However, this approach is wasteful when the relative intensity of interrupt or handshaking signals is high. Using short frames on the lowest levels is not as wasteful as discarding frames, but this method is less desirable because of the framing header overhead, which is constant regardless of the requirement to send low latency signals.

Mobile media terminals contain modules connected by standardized high bandwidth point-to-point serial or parallel links. Many of these links must simultaneously support both isochronous connections and asynchronous connections, high speed and low speed data transfer, and yet provide very fast latency time for control signals, even if the frame length varies for the different signals and streams, from very short to very long. The emergence of multimedia applications and the required high third generation (3G) performance all require very short and guaranteed latency times when integrating fast hardware (HW) processes to process voice, video and other multimedia streams. These and similar applications require a low latency time on a SoC. In addition, typical Graphical User Interface (GUI) driven multimedia applications generate various and changing data transfer and processing tasks that also need to be executed on the hardware platform.

While serial buses are the preferred choice for fast off-chip communication, parallel data buses are the preferred choice on-chip. However, parallel buses are prone to skewing errors when used for high speed data transfer. The use of a typical off-chip serial bus for off-chip communications is limited because of the requirement to provide a clocking signal. Clocking can be regenerated, which slows down the system, or alternatively asynchronous signaling can be employed. In this approach the clocking for the multilevel asynchronous bus is provided by the multilevel signal itself.

The failure by a single bus to provide sufficient data transfer speed represents a system bottleneck, thereby making the use of multiple point-to-point connections advantageous in a typical SoC architecture. These multiple point-to-point data streams are, however, complicated to control in a flexible way, and the dynamic control of data flow in a SoC architecture is a necessity when implementing flexible software driven applications.

A flexible yet fast method is clearly needed to handle control and interrupt signals with low latency time. The use of dedicated hardware connections would be optimal, but such connections are not always available over a bus connecting different chips or peripheral units.

Even if the frame length is short, such as in the case of the Inter-Integrated Circuit ($I^2C$) bus (a simple two wire serial bus developed in the 1980s), a multinode system will impose latency-related system constraints when the signal is passed over multiple nodes. According to the $I^2C$ specification, a reverse acknowledgment must be received by the source at the next clock transition after the receipt of a character, and in a multi-node system this acknowledgment ripples through a chain of nodes. In this case the round-trip path total latency time can easily be too long for the handling of tunneling acknowledgments, thereby preventing the use of tunneling protocols.

SUMMARY OF THE PREFERRED EMBODIMENTS

In one aspect thereof this invention provides a communications bus that comprises a datalink layer coupled to a physical layer, where the datalink layer functions as a multiplexer operable to multiplex at least one abstract protocol to be superimposed on a datalink layer frame and channel protocol.

In another aspect thereof this invention provides a terminal comprised of nodes, where at least some of the nodes are coupled together by a communications bus that is operable with a plurality of protocol stacks, where individual ones of the protocol stacks are associated with individual ones of the nodes. Each of the protocol stacks include a datalink layer coupled to a physical layer, where the datalink layer functions to multiplex at least one abstract protocol on a datalink layer frame and channel protocol. In the preferred embodiments of this invention one frame comprises a plurality of channels, where at least one channel may be defined as a best effort channel, and where the datalink layer allocates an unused amount of frame bandwidth, if any, to the at least one best effort channel.

In a still further aspect of thereof this invention provides a method to conduct communications. The method includes providing a datalink layer coupled to a physical layer that operates with a protocol having frames each comprised of a plurality of channels, where at least one channel is defined as a best effort channel; and allocating an unused amount of frame bandwidth, if any, to the at least one best effort channel.

In a still further aspect of thereof this invention provides a terminal comprised of nodes, where at least some of the nodes are coupled together by a communications bus operable with a plurality of protocol stacks individual ones of which are associated with individual ones of the nodes. The protocol stacks comprise a datalink layer coupled to a physical layer that operates with a protocol having frames each comprised of a plurality of channels each comprised of tokens. At least one channel is defined as a signaling channel for traffic having a low latency requirement, and the datalink layer is operable to intersperse signaling channel tokens with tokens from at least one non-signaling channel.

In a still further aspect of thereof this invention provides an accessory module that comprises a node for coupling to the terminal that is comprised of nodes, where the accessory module is adapted for coupling the node to at least one node of the terminal through the communications bus.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 4a-4f, collectively referred to as FIG. 4, show communication protocols, where FIG. 4a depicts a command with a source and a destination field, FIG. 4b depicts a command, FIG. 4c depict tunneling of another protocol, FIG. 4d depicts a control flow command, FIG. 4e depicts a start of channel command and FIG. 4f depicts a begin and an end frame;

FIGS. 5a-5d, collectively referred to as FIG. 5, show frame structures, where FIG. 5a depicts a logical view of a frame, FIG. 5b depicts a frame structure without token re-scheduling, FIG. 5c depicts a frame structure with token re-scheduling and FIG. 5d depicts a frame structure with token re-scheduling;

FIGS. 7a and 7b, collectively referred to as FIG. 7, depict routing tables;

DETAILED DESCRIPTION OF THE PREFERRED EMBODIMENTS

Figure 1:
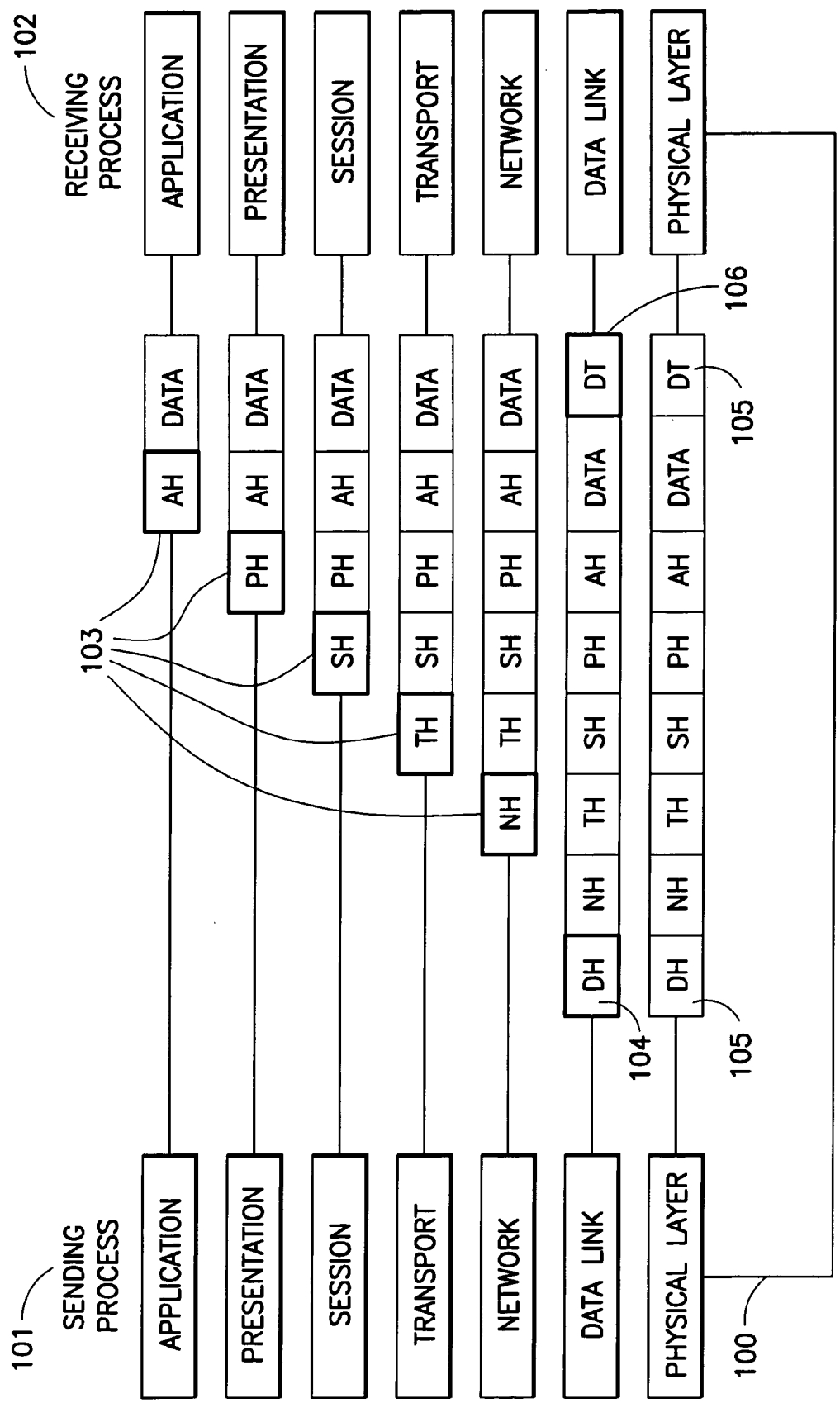
FIG. 1 shows a hierarchical diagram of protocol layers in accordance with the prior art.

Reference can be made to commonly assigned U.S. patent application Ser. No. 10/684,169, filed on Oct. 10, 2003, entitled: "Method and Apparatus Employing PAM-5 Coding with Clock Embedded in Data Stream and Having A Transition When Data Bits Remain Unchanged", by Martti Voutilainen; and to commonly assigned U.S. patent application Ser. No. 10/961,661, filed on Oct. 8, 2004, entitled "Microcode Architecture for a System of a Chip (SoC)", by Kim Sandström, that claims priority from U.S. Provisional Patent Application No. 60/510,680, filed on Oct. 10, 2003, all of which are incorporated by reference herein.

By way of introduction, the preferred embodiments of this invention provide a protocol for use with a point-to-point bus architecture, where the protocol exhibits low latency time for flow control and other signaling, regardless of the length of a data packet frame. The data flow control protocol can be employed by various on-chip or off-chip buses. The protocol interacts only with the lowest protocol layers, and separately buffers data and control signals. In accordance with the presently preferred embodiments of this invention only the protocol layers below the transport layer are used, and the highest protocol layer that can be used is the datalink layer and an abstract routing layer above it. The normal datalink layer is used to transport payload data.

The protocol further enables the bus to be compatible with slower buses such as, but not limited to, the I$^2$C bus, that may be connected to the communications channel. The protocol further enables the bus to also support additional control functions without involving a higher protocol layer such as the transport layer. One specific, but non-limiting, advantage of the use of the embodiments of this invention is a significant reduction in the latency of an interrupt, or any other control signal that is used for, as examples, wake-up or congestion control, and that is sent over the bus.

The embodiments of this invention provide an abstract protocol that is superimposed on the datalink protocol layer. The abstract protocol is generic and not bus dependent, and can be adapted to use various physical layers. The abstract protocol can be used both for on-chip and off-chip buses and can be interconnected with slower buses. The preferred abstract protocol allows the tunneling of other bus protocols. The abstract protocol preferably interacts only with the lowest protocol layers. In one aspect of the embodiments of this invention bus nodes can, in certain cases, operate with only the two lowest layers present in the protocol stack (e.g., the datalink layer and the physical layer). To decrease the latency, separate buffers for data and control signals may be employed in each receiving node of the bus.

A presently preferred embodiment of an abstract datalink layer operates to isolate the idiosyncrasies of different physical layers from the upper protocol levels so that whatever physical layer is used, it has a common interface to the datalink layer.

The presently preferred embodiment of the abstract datalink layer further operates to provide flow control and other signaling with improved latency time, without using a separate physical media, and independently of the data frame length.

The presently preferred embodiment of the abstract datalink layer further operates to provide flow control and other signaling with improved latency time, by not requiring data stream buffering.

The presently preferred embodiment of the abstract datalink layer further operates to extract status information about the underlying physical layer, for example by detecting and signaling a shutdown state, synchronized state, unsynchronized state, power saving mode state, unpowered state and various error states.

Preferably a protocol stack is made independent of the physical layer being used, and in-band signaling may be provided to obtain a low latency needed to permit, for example, for the tunneling of protocols.

Using the preferred embodiments of this invention, the frame length need not be a hinderance for providing low latency for control and interrupt signals when in-band methods are used, for example when a limited number of electrical connections are available, or when it desired to unify control methods in a generic way.

In the embodiments in accordance with this invention, the abstract low latency layer above the datalink layer makes it possible to use longer frames, without increasing the latency time, by separating the abstract layer from the payload data buffering.

Also described herein is a communications bus where the protocol permits interconnections with other types of buses by allowing one or more of low level, high level and hybrid tunneling of other bus protocols.

Also described herein is a communications bus where the protocol permits a Protocol Compatibility Rating to be assigned to individual bus nodes for determining the integrity of the bus network.

Also described herein is a communications bus where devices are hotpluggable, and where the protocol includes a mechanism to discover the identifies of bus-connected devices using a memory-read technique. The protocol may also include a mechanism to detect and recover from errors resulting from device connection and disconnection, and to a loss of synchronization due to a self-clocking nature of the serial bus architecture.

Also described herein is a communications bus where the protocol permits for the allocation of bandwidth, where data sent or received by a datalink layer is divided into frames, where a frame represents a total amount of bandwidth available at a given time, and where each frame is divided into channels, and a number of bytes allocated to a channel represents a percentage of the frame that can be used by a given channel. The bandwidth allocation procedures are preferably based on counting the number of bytes sent in a channel within a given frame, and if the number of bytes equals or exceeds the number of bytes allowed by the frame percentage of the channel, no further data is sent on this particular channel during the current frame. The channels may be divided into cells of a fixed size, and in a frame all cells can be intermixed regardless of the channel from which they originated.

The embodiments of this invention are described and illustrated primarily in the context of a serial communications bus. However, it should be kept in mind that the teachings in accordance with this invention can be applied to parallel communications buses as well, and in general to any type of point-to-point communications bus. Thus, the ensuing description of certain serial bus embodiments of this invention should not be construed in a limiting sense upon the teachings and practice of this invention.

Figure 2:
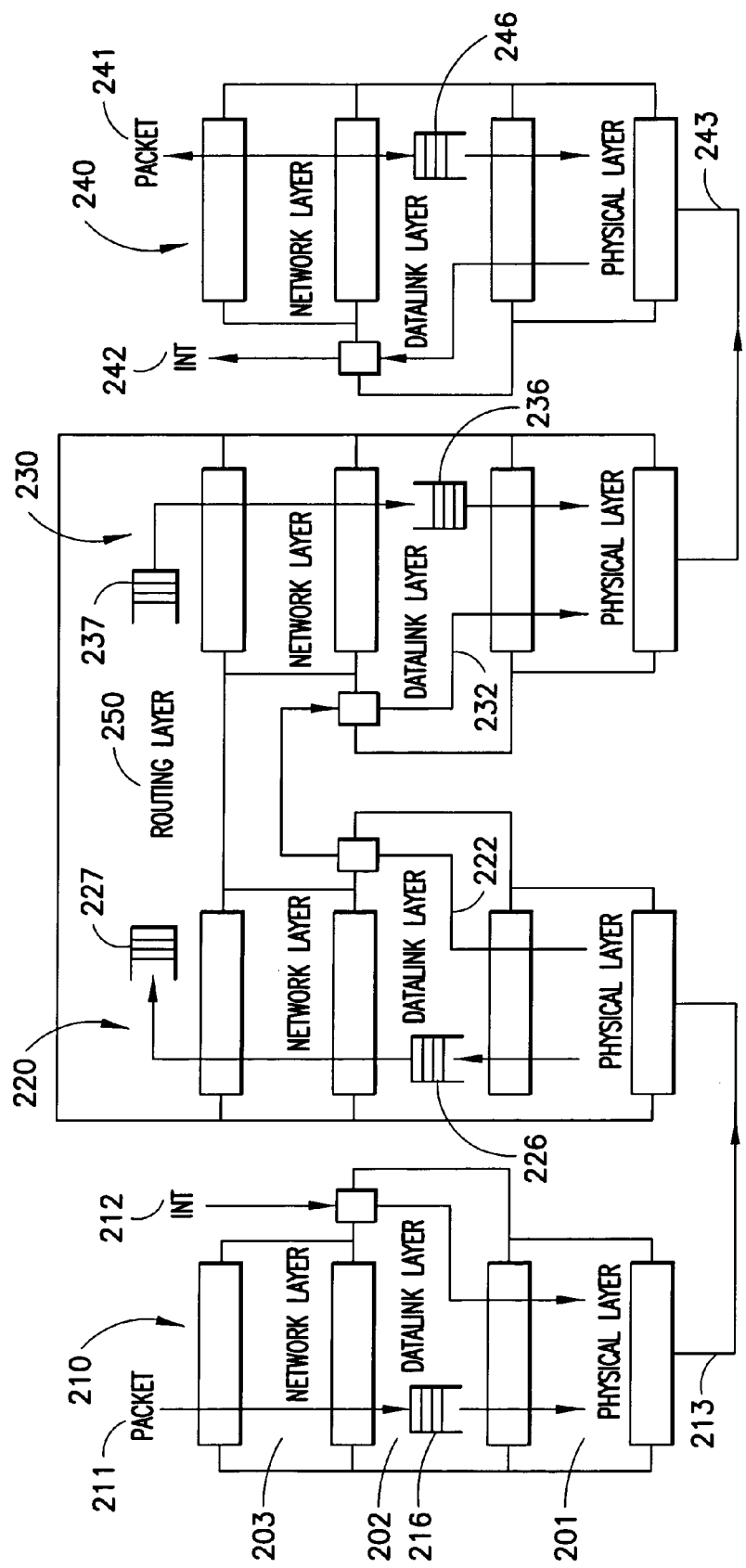
FIG. 2 illustrates the protocol layers used by the present invention.

FIG. 2 illustrates the protocol architecture in accordance with this invention, including a low-latency signaling mechanism and normal data routing as well. FIG. 2 shows a network containing a plurality of nodes: a transmitter 211 with a protocol stack 210; a receiver 241 with a protocol stack 240; and a router 250 with protocol stacks 220 and 230.

At least a portion of the protocol architecture shown in FIG. 2 may be considered to implement a presently preferred bit serial data communications network, referred to herein as the multi-valued high speed serial bus (MVHSS_Bus) 200, in combination with the various aspects of the protocol as described in detail below.

By way of example, and not of limitation, the speed range of the MVHSS_Bus 200 can be from a few Mbit/s to at least 2 Gbit/s. Two or three voltage levels may be used on the bus, although more than three voltage levels may be used as well.

Figure 14A:
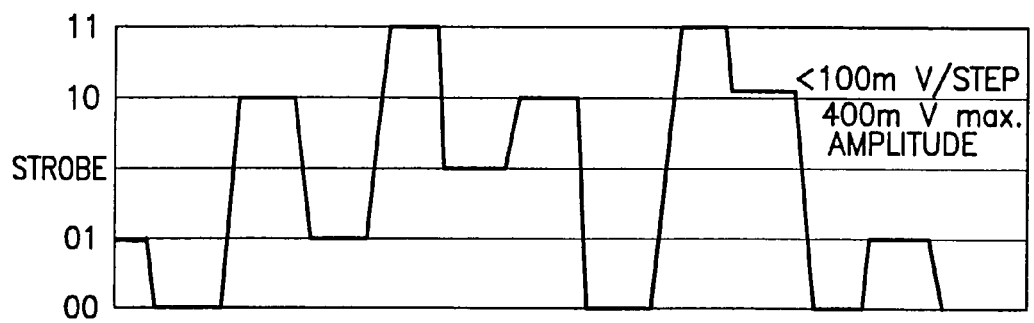
FIGS. 14a-14c, collectively referred to as FIG. 14, show exemplary waveform diagrams of 4-level logic with an additional strobe level (FIG. 14a), and the strobe signal for 100 mV signal amplitude (FIG. 14b) and 200 mV signal amplitude (FIG. 14c).
Figure 14B:
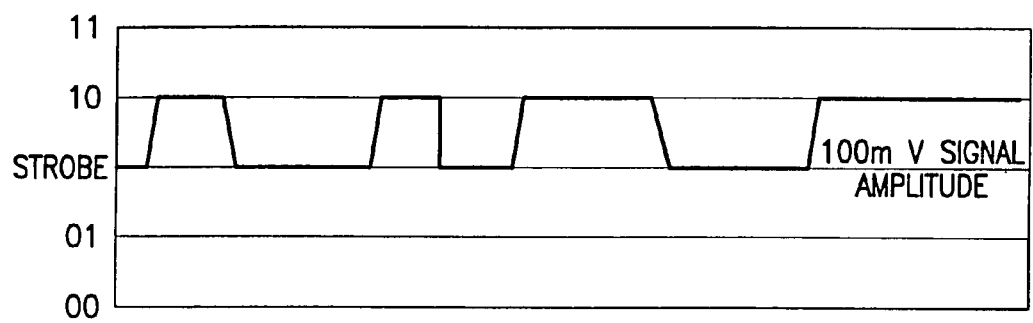
Figure 14C:
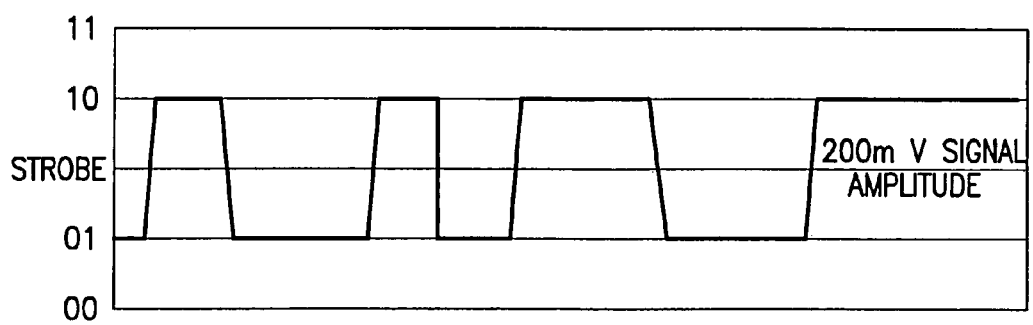

As a non-limiting example of a MVHSS_Bus 200 waveform, reference can be had to FIG. 14, and also to the above-captioned commonly assigned U.S. patent application Ser. No. 10/684,169, filed on Oct. 10, 2003, entitled: "Method and Apparatus Employing PAM-5 Coding with Clock Embedded in Data Stream and Having A Transition When Data Bits Remain Unchanged", by Martti Voutilainen. FIG. 14 shows a differential five level pulse amplitude modulation (PAM-5) signal. FIG. 14a shows an example of 4-level logic with one additional strobe level used for indicating periods when consecutive data is unchanged. The transmitted bandwidth, as compared to 2-level binary logic, is $\log(4)/\log(2)=2$. At the receiver circuitry the rising and falling edges are used to sample the data bits output from the receiver circuit, and the strobe-level implies the presence of repeated data (where there would not normally be a rising or falling edge present in the PAM-5 waveform). The strobe signal for 100 mV signal amplitude is shown in FIG. 14b, while the strobe signal for 200 mV signal amplitude are shown in FIG. 14c. These waveform diagrams are merely exemplary of the possible multi-valued waveforms that can be used for the MVHSS_Bus 200 (e.g., PAM-3 type signaling may be employed in other embodiments).

The protocol stacks 210, 220, 230 and 240 are each composed of the physical layer 201, the datalink layer 202 and the network layer 203, although for simplicity only the layers in the stack 210 are enumerated. Here, the OSI definition of layers is used. The physical layer 201 transforms logic signals into electrical or other signals on the transmission medium 213, and also transform received signals 243 into a logic signal.

The datalink layer 202 is used to enable a peer-to-peer communication, whereas the network layer 203 provides the possibility to send information from one node of a network to another.

To compensate for data jitter in the network, and to reduce the interrupt constraint on the upper layers, the datalink layer 202 includes buffers 216, 226, 236, 246. The buffers 216, 226, 236, 246 make possible fast, low-level control flow. Both the fast flow control and the buffering tends to reduce the number and the size of buffers needed elsewhere.

The routing layer 250 is responsible for forwarding those packets that have not yet reached their destination. The decision to forward a packet to a given part of the network is based on the examination of dynamic routing tables stored in routers.

Many router architectures exist, but for simplicity and for ease of understanding in FIG. 2 the router 250 (routing layer) is simply exemplified by a set of input buffers 227 and a set of output buffers 237, and the routing take place between these and other buffers, not shown.

When an interrupt 212, or a control signal or any low latency signal is triggered, the network layer 203 is bypassed and this signal is encoded at the datalink layer 202. In the receiving peer node of the router 250, the datalink layer 202 handles the low latency signal 222 in a specific way: it bypasses the normal data buffering and immediately forwards it to the abstract low latency routing layer 250 that, in a short period of time, typically in only a few clock cycles and with the help of a routing table, can decide where to forward the low latency signal 222 as the signal 232 and eventually the signal 242.

After routing the low latency signal to its destination node, the router 250 and receiver datalink layer 202 pass this signal in a specific way: by bypassing the buffers 236, 246 of the datalink layer 202 to achieve an optimal respond time.

The signaling mechanism presented can also be used for data flow control: when a receiver 240 is able to handle more data, it informs the transmitter 210 by sending a data flow control command, which includes an indication of the number of free bytes still remaining in the receive buffer 246.

At this point it is important to understand that the data flow control is preferably handled in the datalink layer 202, and is therefore applicable to adjacent nodes. Data flow control operates between these two nodes, and is handled by the router 250 in order to be passed on. In the presently preferred MVHSS_Bus 200 various MVHSS_Bus routers may link the data flow control between two segments of a bus.

Figure 6:
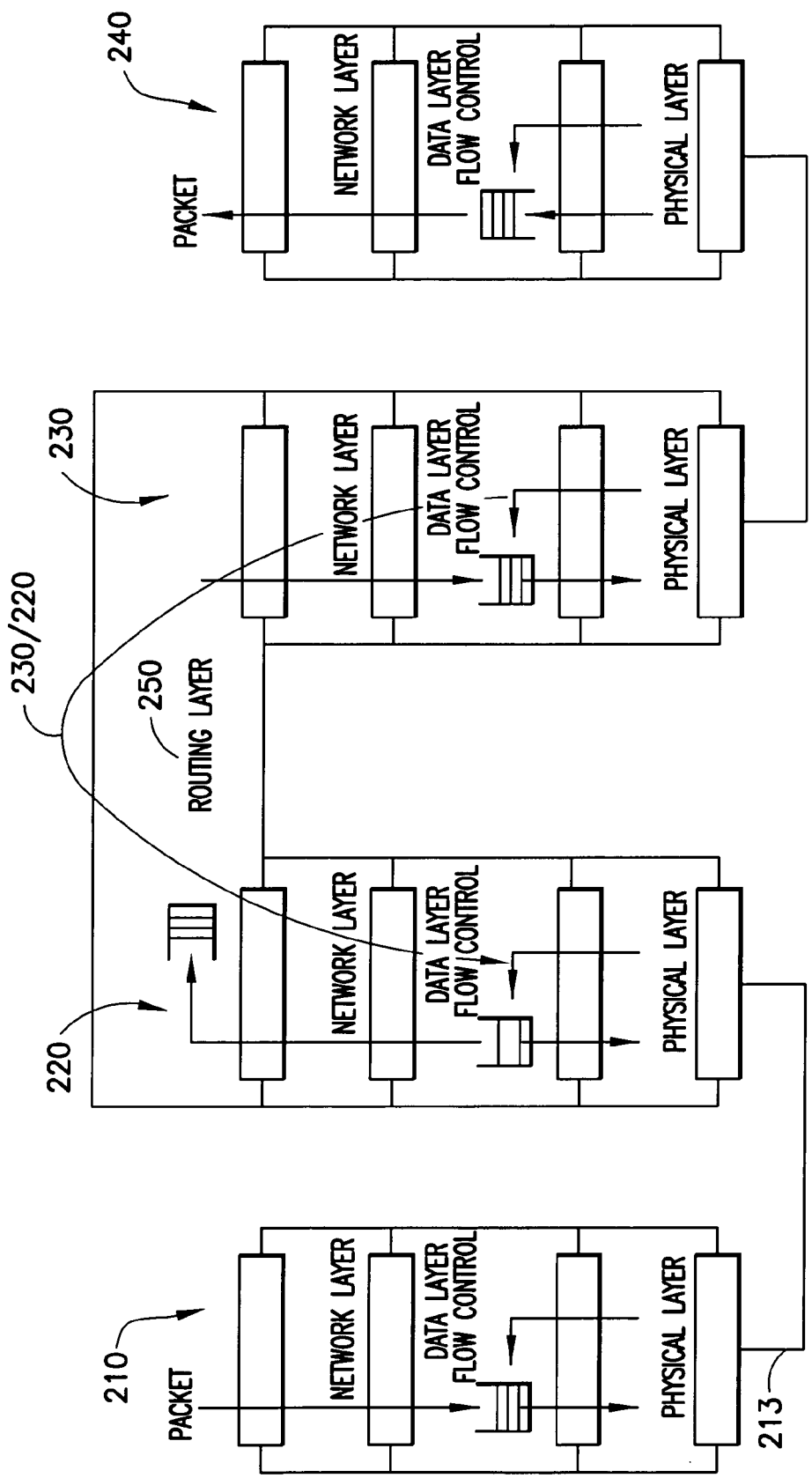
FIG. 6 illustrates handling of tokens used for flow control.

FIG. 6 illustrates a technique for the routing layer 250 to handle flow control. Although not shown in FIG. 2 or 6, normally the connection between two nodes is bidirectional so that flow control messages can be passed in the reverse direction 230/220 as well. This makes flow control from a later node to a previous node possible.

Output buffers are filled with data from the input buffers and the flow control in the reverse direction ensures that no overflow occurs in the output buffers. The flow control information then propagates from one segment of the bus to another. In FIG. 6, node 220 controls the data flow from node 210, and the node 240 controls the flow from node 230. In the routing layer 250 the node 230 controls the flow from node 220. The latter flow control is preferably not implemented using the low latency control, and this local (inter-router layer) function can be implemented in a number of suitable ways (e.g., it may be hardwired).

Other control signals needed for datalink layer use can as well be implemented using the described method. For example, FIG. 4f depicts the use of a begin frame 451 and an end frame 452. Such frames can be used for additional signaling and as markers, for example.

Figure 3:
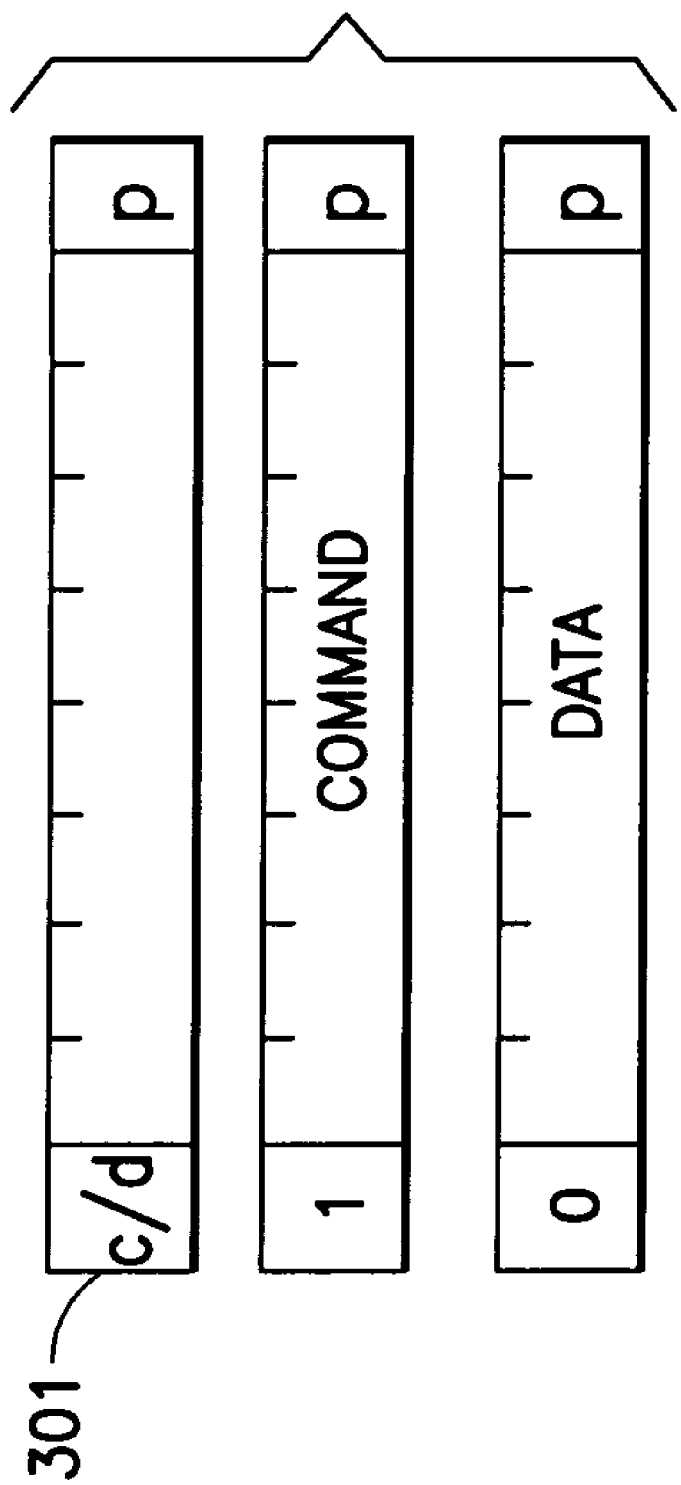
FIG. 3 depicts datalink layer coding.

FIG. 3 shows a typical technique of coding the datalink layer based on an 8-bit word. The bit position 301 distinguishes a command (c) from a data (d) byte. In practice 10-bits are used to code such an 8-bit byte: where one bit (301) is used to differentiate between a data byte or a command; the following eight bits are either data payload or a command; and the last (tenth) bit is used to indicate the parity (P) of the foregoing bits.

FIG. 4a depicts the use of bits in a command word. Each specific command is uniquely described by a 6-bit wide command identifier 412. Each command has additionally a 2-bit wide size field 411, which can be interpreted as the number of 10 bits words needed to complete the command, but may also be a command-specific parameter without a need for additional words.

FIG. 4a further illustrates an exemplary command. An interrupt command, exemplified by 410, is a three word command that includes the command word 410, with size 411 and specifier 412 fields, one word 413 to hold the network address of the originator of the interrupt (source), and one word 414 to hold the network address of the destination.

Low-latency signaling can additionally be used to tunnel existing protocols on a faster bus such as the MVHSS_Bus 200. For example, and referring to FIGS. 4b, 4c, 4d and 4e, according to the I$^2$C protocol two commands are defined: one command 421 is used to send the logic state of the I$^2$C signals SDA and SCL; the other command 431 is used for the same purpose with the addition of defining on what virtual I$^2$C the command is issued (432). With the latter command, it is possible to transparently tunnel several completely independent I$^2$C buses on another (faster) bus, such as the MVHSS_Bus 200, using the methods as described herein to provide the desired low latency signaling. The number of bytes (441) and a channel identifier (442) can also be specified.

FIG. 5a depicts a logical view of a frame 540. A frame 540 is divided into various channels 511, 512, 513, for example data channels and controls channels. One control channel 514 is used to reserve a certain amount of space in the frame 540 to hold the low latency commands, which may occur randomly during the frame. This reserved space is dynamically allocated and ensures that insertions of interrupt or control commands in the data flow do not lead to the frame 540 exceeding a defined size.

To avoid increasing the latency caused when long channels are used, tokens may be inserted in a channel, and the tokens from different channels can be advantageously interleaved or mixed when inserted into a channel. FIGS. 5a, 5b, 5c and 5d illustrate the result of rescheduling the tokens from different channels. The channels 511, 512, 513 of the frame 540 of FIG. 5a can be divided into tokens, such as the illustrated tokens 521, 522, 523 of channel-1 512 shown in FIG. 5b. Each token includes an identifier 531, 532, 533 for identifying from what channel the token is derived. As is shown in FIGS. 5c and 5d, the tokens from different channels can be mixed and rescheduled for transmission in the datalink layer 202, and furthermore the low latency signaling indications, such as the interrupt (INT) and control (CTRL) signals 544, 545, 546 (in FIG. 5b) and 568 and 569 (in FIGS. 5c and 5d) can be interspersed with the channel tokens (as particularly shown in FIG. 5d). In this manner the low latency link signaling information can be provided more rapidly to the network node(s) that require this information.

In FIG. 5b the interrupts 544 and 546, and the control command 545, are depicted as interleaved in the channels 541 and 542. A "best effort" channel is designated 543, and its tokens may also be re-scheduled and interspersed with tokens from other channels, as depicted in FIGS. 5c and 5d. Such best effort channels are described below.

As employed herein a token is considered to be the smallest amount of data that can be sent from the datalink layer to the physical layer. That is, a token may be considered to represent an "atomic" unit of information. As employed herein a cell represents some number of at least one, but preferably more than one, tokens. It is at the cell level that dynamic rescheduling of the channels may occur. The larger the number of tokens per cell, the larger is the granularity of the data for the scheduling and rescheduling task.

The cell size is not necessary the same for different channels. Furthermore, a cell may have a dynamic size. A cell may be considered to be a small piece of a channel, including the channel number, and the use of the cell mechanism enables having more than one given channel in a given frame.

All cells are assumed to occur in order. Thus, to rebuild the channel the receiver just needs to pack the cells in the received order. It is not necessary for the datalink to know the number of cells in a given frame, since the beginning and end of the frame is explicitly specified (see FIG. 4f).

Returning to the description of FIGS. 5a-5d, the frame 540 according to FIG. 5b can also be rescheduled as shown in FIG. 5d with one interrupt 568 and one control command 569. The remaining unused portion (bandwidth) 557 of the frame 540 shown in FIGS. 5c and 5d is available for low latency signaling.

FIG. 5d shows the same rescheduling from FIG. 5c with one interrupt 568 and one control command 569. Otherwise, compared to FIG. 5c, the main structure of the frame is the same, and the tokens 551, 552, 553, 554 and 555 are respectively the same as 561, 562, 563, 564 and 565. However, the reserved space 557 is now smaller because the two low latency control signals 568 and 569 have been rescheduled and can now be found inserted into the tokens 552 and 555, respectively.

Generally a main processor is the recipient of interrupts and acts upon them by starting an interrupt routine. This routine can be generic, and involves the identification of the interrupting node. In the presently preferred embodiments of this invention it is advantageous to include such information in the interrupt token (e.g., 568) in order to reduce processing time and to improve the reaction time to the interrupt. In this context the receipt of the interrupt token by the processor is considered to be the interrupt, and the passing of the token from the service demanding node to the processor to be the latency time, even if the actual time between the issuing of the first interrupt token and the start of the context switching in the handling processor is the actual latency time. However, the time needed to perform the context switching caused by the interrupt is usually much shorter than the time needed to pass the interrupt request token.

Figure 13:
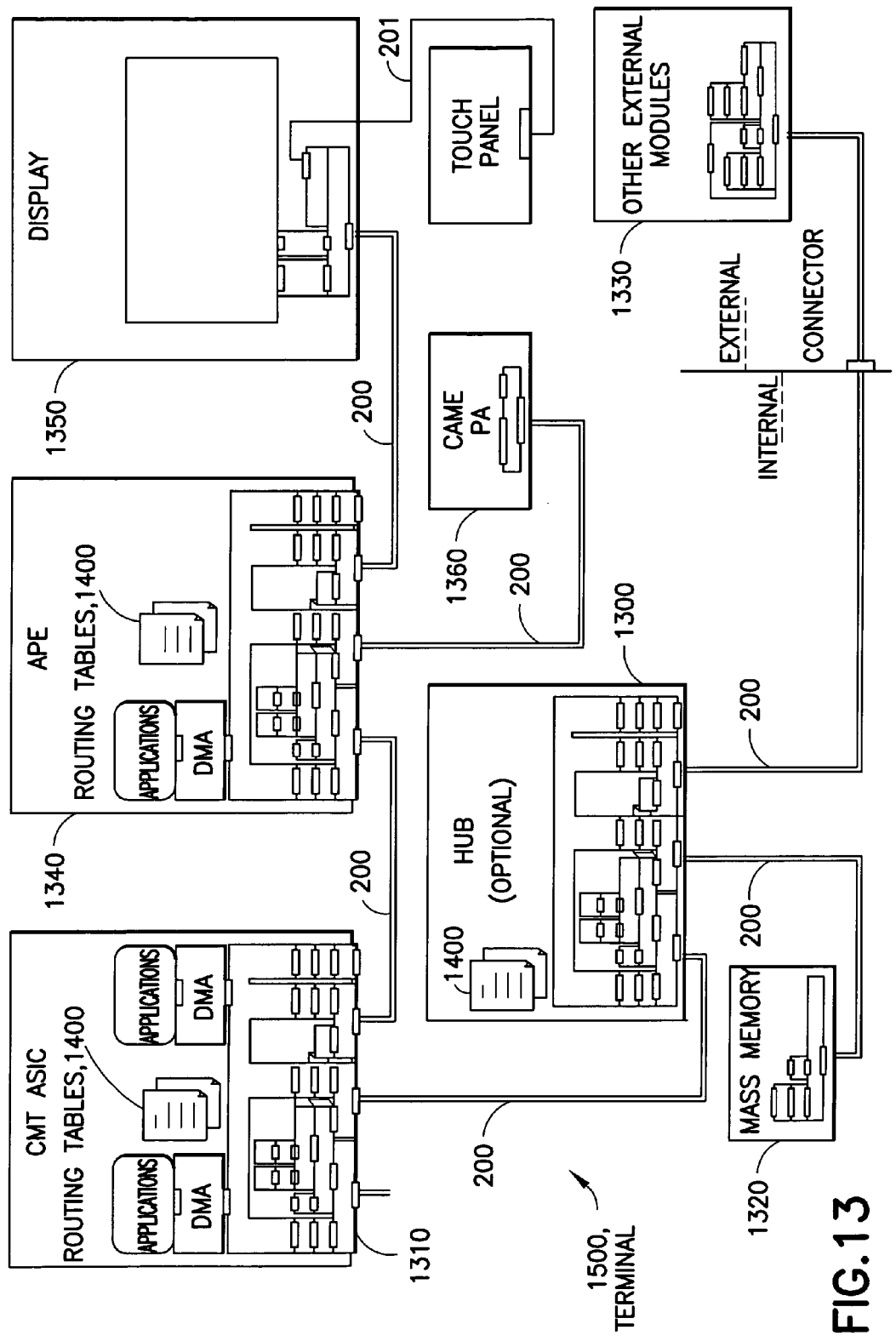
FIG. 13 is a simplified block diagram of a portable terminal, such as cellular telephone, that is constructed with nodes interconnected by the presently preferred embodiment of a multi-valued high speed serial bus (MVHSS_Bus) and protocol therefor as described herein.

In a typical media terminal (see a presently preferred embodiment of a media terminal 1500 in FIG. 13) an interrupt from a camera component 1360, for example when picture data is to be transferred, is always received by the platform processor, so the routing of the interrupt token is extremely simple, i.e., the interrupt token should always be routed towards the processor so no routing tables are needed. It can, however, be envisaged that there may be several possible interrupt receivers. In this case the token includes information about the identity of the intended receiver, and the passing nodes have routing tables that can be dynamically changed by the main processor whenever the terminal configuration or mode of operation changes. This identity can be passed as was previously described with regard to FIG. 4a.

Generally, every node on the MVHSS_Bus 200 may have the ability to both generate and receive interrupts. In this case every interrupt token is preferably coded with the recipient node, the originator node, and the type of interrupt. The type of interrupt can be contained in the interrupt command itself.

Using a network layer address for the routing tables implies including long literal strings of unique network addresses, each several bytes long, in the routing table. Depending on the number of bytes of a network layer address, this could result in undesirably long routing messages that would increase the latency time.

Another approach uses only a few bits to code the destination of an interrupt, assuming that only a few nodes on the bus would require interrupt services. In this case, after the registering of such nodes that can send or receive interrupts, a unique number can be assigned to each registered node. These numbers can represent the interrupt channels. FIG. 7 exemplifies the distinction between a conventional IP LAN routing table (FIG. 7a) and the reduced size routing table that uses short channel numbers in accordance with this invention. It is clear that substantial overall memory savings can be obtained using the short channel numbers whenever a number of nodes are connected together, because each node has its own routing table stored in local read/write memory. As earlier described, these routing tables are preferably dynamically rewritten whenever the system configuration changes.

Based on the foregoing, it should be clear that this invention provides at least one abstract protocol that can be superimposed on the datalink protocol layer 202 in order to provide a point-to-point serial bus architecture with a low latency time for flow control and other signaling, regardless of the length of the packet frame. The abstract protocol is generic and is not bus dependent, and it may be adapted to use various physical layers. It can be used with various buses, and allows interconnections with slower buses by permitting the tunneling of other bus protocols.

An aspect of this invention is the control of data and command flow over a physical communications channel between a transmitter and a receiver, and more specifically a protocol for a point-to-point serial bus architecture with low latency time for flow control and other signaling, regardless of the length of the used data packet frame. The abstract data flow control protocol can be employed by various on-chip or off-chip buses. The protocol interacts only with the lowest protocol layers, and separately buffers data and control signals. As an additional benefit the protocol allows the bus to be compatible with other, possibly slower buses, such as I²C, that may be connected to the communications channel, and also to support additional control functions without involving a higher protocol layer.

An embodiment of a method passes fast control signaling, and can be used in various bus systems regardless of whether the bus is asynchronous or synchronous, and regardless of whether the bus uses a hardwired clock signal, or if the clock signal is regenerated at the receiver. The performance of the method to pass fast control signaling is not dependent on the frame length that is used, and makes a guaranteed small latency time possible.

The use of the method to pass fast control signaling does not decrease overall system performance, as no frames need to be discarded. The use of the method to pass fast control signaling also allows efficient use of all available frame space for the payload, because the same signaling method can be used in the reverse channel to signal remaining frame space to the transmitting end. Additionally the method to pass fast control signaling can be used to signal node and system status information in the same way.

An important advantage in many applications is that the datalink layer 202 provides flow control and other signaling with improved latency time, without using a separate physical media and independent of the data frame length.

An advantage of the use of the datalink layer 202 is that it provides fast control and other signaling with improved latency time, by bypassing the data stream buffering. Yet another advantage that is realized by the use of the datalink layer 202 is that it can be adapted to extract and signal status information about the underlying physical layer 201, and it can be adapted to isolate the idiosyncrasies of different physical layers from the upper protocol levels so that whatever physical layer is used, it has a common interface to the datalink layer 202.

As was discussed above, the MVHSS_Bus 200 is a low power high-speed serial link bus designed as a generic and modular bus that is well suited for portable terminals, such as cellular telephones, but is not limited to only this important application. Representative advantages of the MVHSS_Bus 200, as compared to a traditional bus, include the following:

a) only a few signals are needed, reducing the number of pins or balls on an IC package, and thus reducing cost and increasing reliability;

b) improved immunity to electromagnetic interference;

c) an ability to replace many existing types of buses because of its modularity and generality; and d) the bus is hotpluggable, enabling components to be removed from and added to the bus without turning off the power.

With regard to this latter feature, different techniques are used to detect errors, disconnections and, more generally, to recover from errors or malfunctions.

In one aspect thereof the MVHSS_Bus 200 is a high-speed, hotpluggable serial link. When a MVHSS_Bus 200 link is operating normally, error events may occur, including bit errors, disconnection and desynchronization, and it is thus desirable to quickly recover to a fully operational state. An aspect of this invention employs a configurable and flexible set of recovery mechanisms.

One desirable feature of this invention is that it can be used in many different applications and in diverse electrical environments. In other words, depending on where the MVHSS_Bus 200 is used, some recovery mechanisms may become useless or redundant. Since every recovery mechanism use resources and bandwidth, it is a feature of this aspect of the invention to select what recovery mechanism is best suited for a certain operational environment.

In a typical MVHSS_Bus 200 network there may exist peer-to-peer links with different electrical environments: e.g., a part of the network is over a cable, another part is on a printed circuit board, and another part is used to connect to a detachable module. The invention provides the possibility to select among a set of recovery mechanisms to find one or ones that are best suited for a particular environment.

Bit errors can induce many other different kinds of errors. These include, but are not limited to, a loss of synchronization and a misunderstanding of a control code. Depending on the environment where the MVHSS_Bus 200 is used, the bit error rate can vary significantly (e.g, cable vs. printed circuit board).

At a lowest level, bit errors are dealt with using a parity bit or a small CRC code. In a low bit error rate environment, a token can be 10 bits: one bit for distinguishing between a command token or a data token, eight bits of data and one parity bit (see FIG. 4).

If the environment has a higher bit error rate, more than one parity bit can be used (e.g., a three bit CRC can be used). In this case, a token may be 36 bits in length: with one bit for distinguishing between a command token or a data token, 32 bits of data and three bits of CRC. When a bit error is detected, the erroneous token can be discarded.

Since the MVHSS_Bus 200 may use hotpluggable links, a disconnection may occur at any time. To avoid any erroneous data or behavior of the bus, it is important to be able to detect a disconnection event. The physical layer aids in this process, because it is specified to be able to signal an electrical disconnection to the datalink layer. However, every disconnection event does not lead to erroneous transmissions or data. In the best case, the disconnection occurs when nothing is transmitted on the link, and no complicated and time consuming mechanism is needed to recover.

In one embodiment that is useful for determining if the disconnection created errors of any kind, a special command token is used to "ping" the link after a disconnection is detected. If the sender of the "ping" receives a reply in a given time, no further actions need to be taken and the link is considered as being fully operational. The "ping" mechanism can reduce noticeably the recovery time of the link.

The "ping" token may be used also at any time during normal operation as an additional security check. For example, when a link is idle for some specified period of time, a periodic check can be made to ensure that the link is still up and running.

Desynchronization events can be more difficult to handle than bit errors or disconnections. They are also more complex to detect and to recover from. One of the major reasons is that a desynchronization event can have different causes and effects. A bit error may also create a desynchronization event, for example if a clock edge is not seen, or if an artificial clock edge is generated. The opposite is true as well, when a link is desynchronized then numerous bit errors can occur.

Based on the foregoing, it can be appreciated that it is important to be able to detect accurately an occurrence of a desynchronisation event, knowing that this often results in a lengthy recovery time because the desynchronization detection may take some considerable amount of time.

To detect an "out of sync" link, one technique assumes, after some number of consecutive tokens received with bit errors, that a desynchronisation event has occurred. This is related to the bit error rate: if the link has a very low bit error rate, the occurrence of a few consecutive erroneous tokens is very unlikely.

To detect an "out of sync" link, the "ping" command token can also be used. If no reply is received after sending a "ping", it may be assumed that either the link is disconnected, or the link is desynchronized. It is advantageous to have a "low level ping" when the datalink layer 202 is not busy, as the reply can be received in a shorter amount of time, which aids in more rapidly identifying the problem.

To detect an "out of sync" link, an "out of sync" command token may be sent when the receiver of a node detects a desynchronisation situation. This is possible because a MVHSS_Bus 200 link is specified to be always bi-directional.

To recover from an "out of sync" condition, a repetitive synchronization pattern is preferably used. Since the transmitter is always used as a reference, the receiver is used to resynchronize. The repetitive pattern may be also sent periodically as a precaution, as its use shortens the recovery time if a desynchronisation were to occur.

Based on the foregoing, it should be apparent that different mechanisms are preferably employed to facilitate error detection and recovery, including electrical disconnection detection from the physical layer, coding of the data transmitted on the link with at least one parity bit, or three (or more) bits of CRC, the "out of sync" command token, counting the number of consecutive erroneous tokens, and the use of a repetitive synchronization pattern.

A discussion is now made of bandwidth allocation. For certain devices connected to the MVHSS_Bus 200, it is important for proper operation that the bus can guarantee a certain amount of bandwidth when receiving or sending data. Of course, any bandwidth allocation mechanism consumes some amount of bandwidth itself, and increases by some amount the bus latency because of buffering and other related operations. Nonetheless, in many applications a guaranteed bandwidth is more important than the small increase in latency. On the other hand, in other applications a best effort transmission technique is more suitable, while in still other applications a minimum bus latency is the most important requirement. The issue then becomes how to accommodate the various service requirements to suit the majority of applications that require access to the MVHSS_Bus 200.

With regard to a best effort requirement and bandwidth allocation co-existence, a bandwidth allocation mechanism may be needed in a MVHSS_Bus 200 network connecting only two nodes together: for example an engine split into two entities and using the MVHSS_Bus 200 as a communication channel. In this case, one single link may need to be shared by many processes. The last observation leads to the conclusion that the bandwidth allocation mechanism is preferably implemented at the datalink layer 202 (see FIG. 2). A presently preferred, but non-limiting approach uses a special coding of the datalink layer 202.

To make the distinction between best effort and bandwidth allocated data, one may divide each frame 540 into channels (as was discussed in relations to FIG. 5). The beginning and the end of a channel are marked respectively by a "begin channel" control token and an "end of channel" control token, and a number is assigned to every channel to distinguish between them.

One of the channels (for example, channel 543 in FIG. 5b) may be reserved for best effort transmission of data, one may be used as a special control channel (for example, channel 514 in FIG. 5a), and the remaining channels are used by the bandwidth allocation mechanism. The remaining channels may each implement the same communication protocol, or they may implement different protocols, as will be discussed in further detail below.

The allocation of bandwidth is made with respect to a given route connecting two given nodes of the network. In other words, when allocating the bandwidth the entire route is setup between the two nodes: at which time one has created a circuit or a virtual channel between the two nodes. As such, the network layer 203 (FIG. 2) may not actually be needed, as one may send or receive data from one node to another by putting the data in at one end of the pipe (virtual channel). A result of this analysis is that the network layer 203 may use only the best effort channel 543. Nonetheless, to setup a circuit with bandwidth allocation, the network layer 203 is used to reserve the needed bandwidth from node to node along the route connecting the two nodes.

When the route is configured, the best effort traffic and the bandwidth-allocated traffic are made independent of each other, and can then be dealt with more efficiently in the routing layer 250.

With regard to the allocation of bandwidth, all data sent or received by the datalink layer 202 is divided into the frames 540, where a frame represents a number of bytes sent at a given speed, or the total amount of bandwidth available at a given time. Each frame 540 is then divided into the channels, as shown in FIG. 5. The number of bytes allocated to a channel represents the percentage of the frame 540 that can be used by a given channel. Since the actual link bandwidth is known, the bandwidth allocated to each channel can be specified by the percentage of the frame 540 that is allocated to the channel.

A presently preferred bandwidth allocation mechanism is thus based on counting the number of bytes sent in a channel within a given frame 540. If the number of bytes equals or exceeds the number of bytes allowed by the frame percentage assigned to the channel, no further data is sent on this particular channel during the current frame 540. At the start of the following frame, all counters are zeroed and all channels can once more be transmitted on the link.

It can be appreciated that some situations may arise where the amount of required buffering becomes substantial. For example, one such situation is where there is a long frame and a channel with bandwidth allocation uses a significant percentage of the frame. This configuration may lead to the necessity to be able to buffer a significant portion of the frame 540. Typically, all data received when this channel is active on the MVHSS_Bus 200 is preferably buffered, and can be sent only when the channel terminates. Furthermore, this situation can lead not only to the use of larger buffers, but also to larger latencies and jitter in the system.

One solution divides a channel into cells, as was noted above, where each cell has a fixed size. In a given frame 540 the cells can be intermixed regardless of the channel from which they originated. That is, cells from different ones of the channels can be transmitted so as to be temporally adjacent to one another. With this mechanism it becomes possible to insert cells of shorter channels between cells of a longer channel, and thus obtain a more uniform re-partitioning of channels within a frame 540. Of course, some complexity is added to the datalink layer 202, but the reduction in buffer size, jitter and bus latency more than offset the additional datalink 202 layer complexity.

As was noted above, the presently preferred MVHSS_Bus 200 is hotpluggable. In order to most effectively use the bus a dynamic mechanism is provided to identify what device(s) are connected to the bus. Since it is desirable to permit the MVHSS_Bus 200 to connect to very simple devices, implying devices that are not required to implement a complete MVHSS_Bus 200 protocol stack, the device identification system preferably employs a relatively low-level identification mechanism.

In this context, a low level and simple mechanism is provided to support the identification of newly attached devices to the MVHSS_Bus 200. This supporting mechanism may be referred to as a discovery mechanism. The mechanism is referred to as "discovery" because it does not specify how to identify a given device, but instead provides the tools necessary to obtain the information needed by the device identification process.

In the preferred embodiment the information is obtained from a device connected to the MVHSS_Bus 200 by a mechanism that uses a minimum of resources. A device supporting this preferred mechanism preferably has access to the MVHSS_Bus 200 physical layer 201 and at least a small part of the datalink layer 202 (see FIG. 2). The discovery mechanism is included in the datalink layer 202.

One of the simplest and most generic techniques uses a "read from a memory" type of mechanism. Across a MVHSS_Bus 200 link, this mechanism is used to read a small configuration and/or identification memory included in the device. To support this discovery mechanism, a "discovery command" is used in the datalink layer 202. The format of this command may slightly vary depending of the size of a token on the datalink layer, but in general it provides one byte for coding the size of the information read, and two bytes for coding the starting address of the read operation.

When the read command is issued, the device replies by sending the exact number of bytes requested in the command. The request and the reply may be or may not be included in the configuration channel of the datalink layer 202.

The same discovery mechanism may be extended to support write operations of small amounts of data to a device.

With regard to discovering the capabilities of MVHSS_Bus 200 devices, by reserving a small amount of memory starting at, preferably, address 0x0000, one may also provide the minimum information needed by a node to determine what are the capabilities and limitations of a peer node. One important item of information is the maximum speed supported by the node, but other potential items of useful information include, but are not limited to: whether the node supports hotplug; the coding supported by the datalink layer; and what modes or type of physical layer is supported. Note that this information a related to the MVHSS_Bus 200 interface itself, and is not part of the identification mechanism per se.

A technique is now disclosed to verify the integrity of a MVHSS_Bus 200 implementation or network, and to achieve accurate results from the verification mechanism.

The fact that the MVHSS_Bus 200 is both generic and flexible can introduce certain compatibility issues. For example, the MVHSS_Bus 200 allows different levels of protocol implementation to have the possibility to reduce as much as possible the number of gates needed by a node to be connected. With this approach very simple devices can be connected to the MVHSS_Bus 200 by moving the complexity from the leaf nodes to the core of the network.

A simple method to control the compatibility between two nodes is now described. With the use of the same method it becomes possible to determine if a complete network is properly constructed and to ensure that the network will be operational.

In accordance with this aspect of the invention there is attached to each MVHSS_Bus 200 node implementation a number that is referred to as a Protocol Compatibility Rating (PCR). The PCR indicates what level of implementation or compatibility a given node has.

To determine if a network is properly constructed, the following rules are applied. First, the core of the MVHSS_Bus 200 network is located, where the core represents the set of nodes with the highest PCR number. The core can comprise one or more nodes. Second, by making a topological analogy between a MVHSS_Bus 200 network and a tree, one can define a recursive law implying that starting from the core, and traveling towards the leaves of the network (tree), at each hop the PCR should be equal to or less than the PCR of the branch that one is coming from.

To control the numbering of the PCR, a compatibility ladder is created that specifies what numbers are used, and what minimum functionality must be implemented in a node to conform to a given PCR. Given the compatibility ladder, and the two rules given above, the correctness of a given network can be readily checked.

From the above definition and rules, it should be apparent that an important consideration is to ensure that the PCR of a given node is correct, and/or that a node actually implements all of the features implied by the node's PCR. To aid in the testing of the PCR level, system level models and benchmarks are preferably employed, and every implementation of a MVHSS_Bus 200 node or device is then tested against these system-level models. Only when a node passes successfully the PCR test is the node assigned the corresponding PCR. From a standardization perspective, this implies that these models be part of the standard and support the evolution of the standard.

The protocol tunneling procedures that were briefly discussed above are now discussed in further detail below with reference to FIGS. 8-12. An important aspect of the MVHSS_Bus 200 is the tunneling of other protocols and/or the possibility to interface the MVHSS_Bus 200 with other devices that do not support a MVHSS_Bus 200 interface. Various techniques to achieve a backwards compatibility with existing devices are now presented.

Backwards compatibility is an important issue in many systems. With regard to the MVHSS_Bus 200, backwards compatibility implies that one be able to interconnect different lower speed protocols: for example, the $I^2C$ protocol. In this regard it is instructive to note that the problem of tunneling a given protocol is not completely specific to one protocol, but more to which class the protocol belongs. Protocols based on unidirectional messages are the simplest to tunnel as there are no interactions (e.g., message acknowledgments) occurring at a low-level. At the opposite extreme, protocols based on low-level read/write operations are much more difficult to tunnel. Indeed, these protocols can be characterized as exhibiting a "memory type of structure". While a write operation may be considered in some cases to be a unidirectional operation, in the case of $I^2C$ this is not the case because of the presence of an acknowledge bit. A read operation is a bi-directional operation at a very low-level, and is thus always problematic.

As such, it can be appreciated that every protocol that exhibits low-level, bi-directional operations can be difficult to tunnel. However, many such protocols may be tunneled by the use of the same techniques, resulting in the same basic architecture of the protocol stack. As one example, if the system can successfully tunnel $I^2C$, it will most likely be able to tunnel many other protocols involving the same type of low-level operations.

Handling the general case of making two different networks interwork is exceedingly difficult. However, there is a special case that is more manageable. This case is where the source and destination hosts are on the same type of network, but there is a different network in between. A well-known example is the tunneling of the IPv6 protocol over an IPv4 network. To handle this problem, some peripheral nodes of the IPv4 network have a special function: there are able to encapsulate an IPv6 packet in an IPv4 packet. In those nodes (multi-protocol router nodes) certain special routing tables are needed as well. When an IPv6 packet is required to travel across the IPv4 network, the IPv6 packet is routed to one of the multi-protocol routers of the IPv4 network, and there encapsulated in an IPv4 packet. This packet is then routed in such a way that it reaches another multi-protocol router connected to the another IPv6 network. This multi-protocol router then extracts the encapsulated IPv6 packet from the IPv4 packet and forwards it on the IPv6 network.

By classical definition, a tunneling technique is used between two networks of the same type, at the same level in the protocol stack.

As an example, assume a general protocol used to transmit data from peer to peer. This implies that only the physical layer and the datalink layer are defined. The description of a general protocol in accordance with this aspect of the invention includes almost all protocols that do not define a routing mechanism. Of most interest to this invention are protocols that include, but are not limited to, I²C and System-Packet Interface (SPI) and various memory buses. It may also be assumed that the physical layer 201 and the datalink layer 202 are implemented in hardware.

In the general protocol in accordance with the embodiments of this invention the interface provided by the datalink layer 202 is referred to as the "macro interface". For many protocols, the "macro interface" can be described roughly by a set of registers, in some cases by an interrupt mechanism and a Direct Memory Access (DMA) mechanism.

Figure 8:
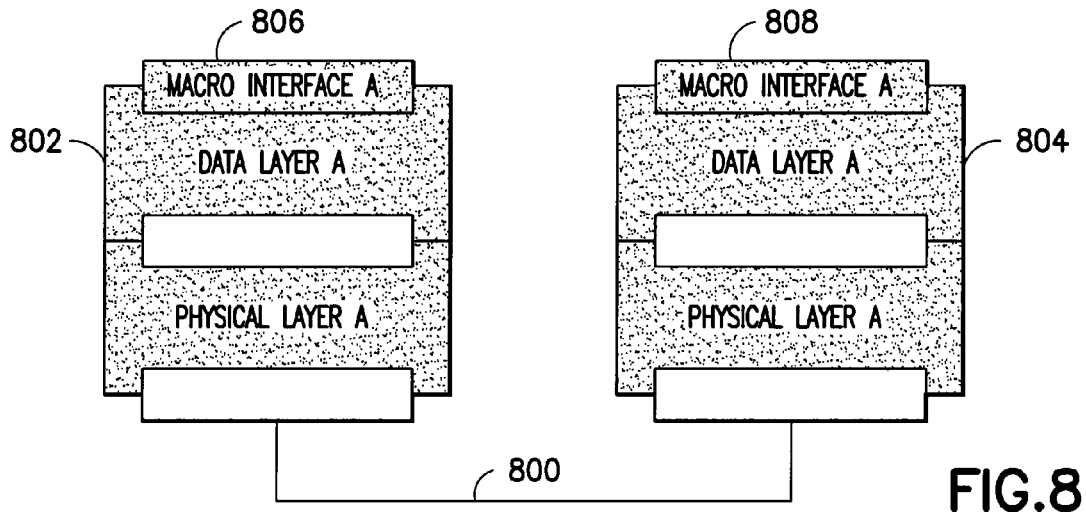
FIGS. 8-12 are block diagrams that are referred to during a description of the operation of a tunneling layer.
Figure 9:
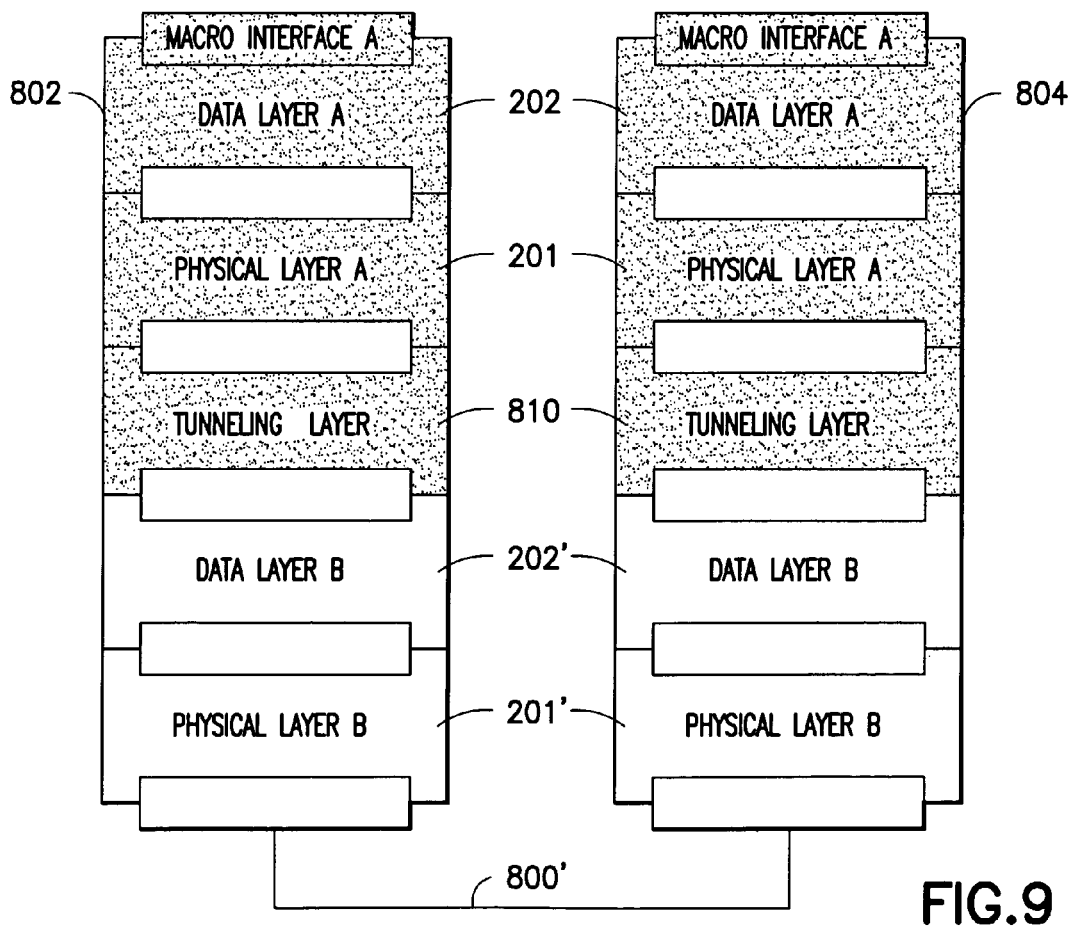
Figure 10:
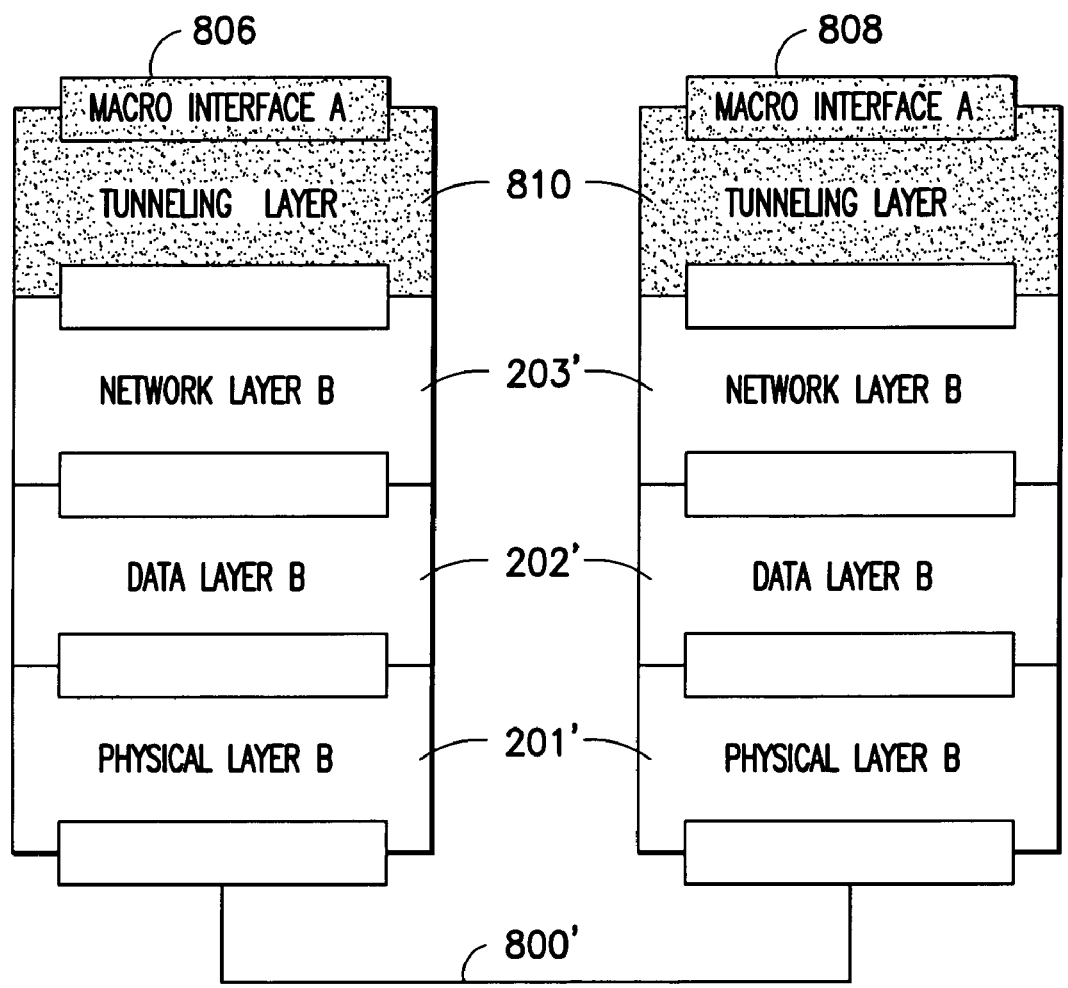

Reference can be made to FIG. 8, which shows protocol stacks 802 and 804 in a two node bus 800, and two macro interfaces 806 and 808 associated with a protocol A.

Henceforth, the general protocol is referred to as protocol A. To send data from one node to the other, the software of the sending node uses the macro interface of protocol A. It should be noted, however, that the software is not concerned about the datalink layer 202 or the physical layer 201, the only relevant part of the protocol A for the software is the macro interface 806, 808.

As a definition of low-level tunneling, assume a hardware implementation of protocol A. As in FIG. 9, the protocol needs to create a tunneling layer 810 that encodes the state of the physical layer 201 of the protocol, and permits encapsulation by the datalink layer 202' of protocol B, the transporting protocol. Using the datalink layer 202' of protocol B the encoded state is sent via the physical layer 201' of protocol B. When the data arrives at the datalink layer 202' of the receiving node (protocol B), the tunneling layer 810 decodes the encoded state and forwards it to the physical layer 201 of protocol A.

Based on even this simple description it can be appreciated that there are numerous challenges presented by low-level tunneling. For example, the performance of the transporting layer of protocol B is fixed by the tunneled protocol. Indeed, if the protocol B is a memory bus 800', the maximum latencies allowed in the protocol B will be fixed by the access time of the memory. The consequence is that the design of the protocol B needs to take into account all possible protocol candidates for tunneling. Or if the protocol B is an existing protocol, its performances determines which protocols can or cannot be tunneled.

Since the performance of protocol B is critical, the low-level tunneling takes place as low as possible in the protocol stack of protocol B: if possible at the physical layer 201' or, if not there, at the datalink layer 202'. Of course, this approach leads to another challenge, since one has a mechanism to tunnel a protocol, but only in a peer-to-peer configuration, not to tunnel a protocol across a network.

To avoid this potential limitation, and since a point-to-point physical layer 201 exists in the MVHSS_Bus 200, an optional Hub 1300 (see FIG. 13) is preferred to route the data when there are more than two nodes present. As such, one may add to the routing mechanism already present in the Hub 1300 a second routing mechanism that handles routing data that includes tunneled protocols.

The software compatibility depends mainly on the capacity of the tunneled protocol to deal with a loss of packets and/or with corrupted packets. In every protocol stack, the physical layer 201 is prone to errors, and the upper protocols are designed to take into account a given error rate. By tunneling a protocol, the error rate of the physical layer 201 has the potential to be increased, and new types of errors may be introduced.

In practice, some tunneled protocols may require some modification in the low-level driver(s). However, 100% software compatibility can still be achieved at the operating system level, or at least at the application level.

Part of the difficulties that arise with software compatibility, particularly when considering the hotpluggable nature of the MVHSS_Bus 200, can be overcome at least partially by using the tunneling layer in an extended way. When the physical layer 201 allows it, the tunneling layer 810 may handle also the disconnected state of a device, and generate a known type of error for the physical layer 201. This error reaches the software, which can then retransmit the erroneous message. By so doing, the system can handle short-term disconnection or other errors.

One definition of high-level tunneling uses the network layer 203' of protocol B to transport tunneled protocols. As it can be seen from FIG. 10, which illustrates high-level tunneling protocol stacks, the only part used from the tunneled protocol A is the macro interfaces 806, 808, while the physical layer 201A and the datalink layer 202A are removed. This particular type of high-level tunneling is preferably used between high-level nodes.

With regard to software compatibility, what was said above with respect to low-level tunneling applies as well here. From the software point of view, it does not matter if the physical layer 201 and datalink layer 202 are present, what matters instead is the macro interface 806, 808.

Figure 11:
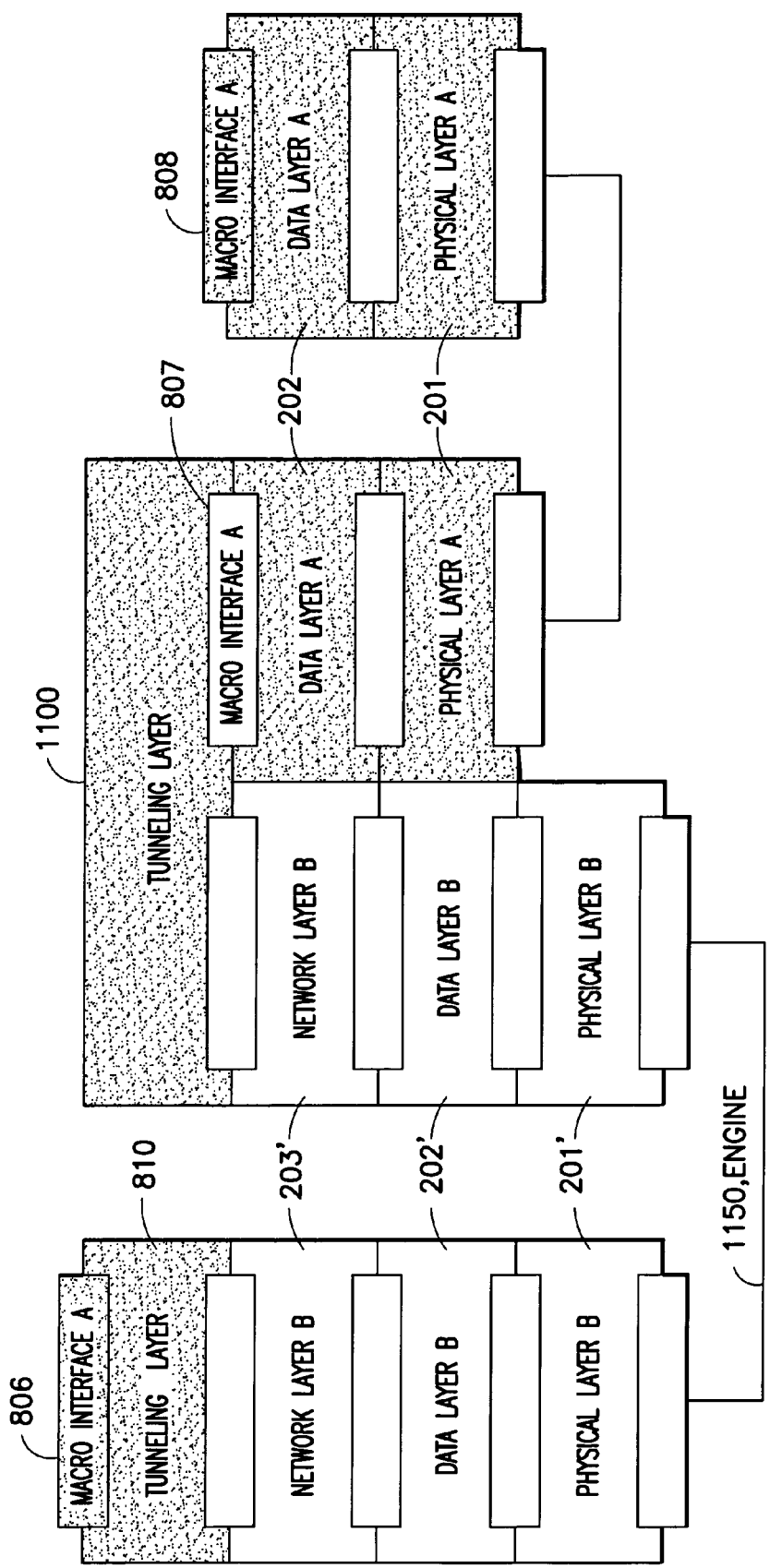

FIG. 11 shows an example of hybrid tunneling where one side of the network includes an engine 1150. Hybrid tunneling may be defined as a mixture of the advantages of low-level and high-level tunneling. Hybrid tunneling does, however, require a different IP block that implements a protocol. The hybrid-tunneling layer 1100 may be considered to be a gateway, and hybrid tunneling may then be considered to be equivalent to providing a gateway between existing buses and the MVHSS_Bus 200. Compared to low-level tunneling, this approach uses significantly less bandwidth, and reduces power consumption when tunneling a protocol. From the software point of view, hybrid tunneling is a powerful way to tunnel a protocol: there are few constraints and a great deal of flexibility in the implementation. The hybrid tunneling layer 1100 interfaces to the protocol B network layer 203', as well as to an (embedded) protocol A macro interface 807. The macro interface 807 couples to a protocol A datalink layer 202, and from there to the protocol A receiving protocol stack associated with the macro interface 808.

Figure 12:
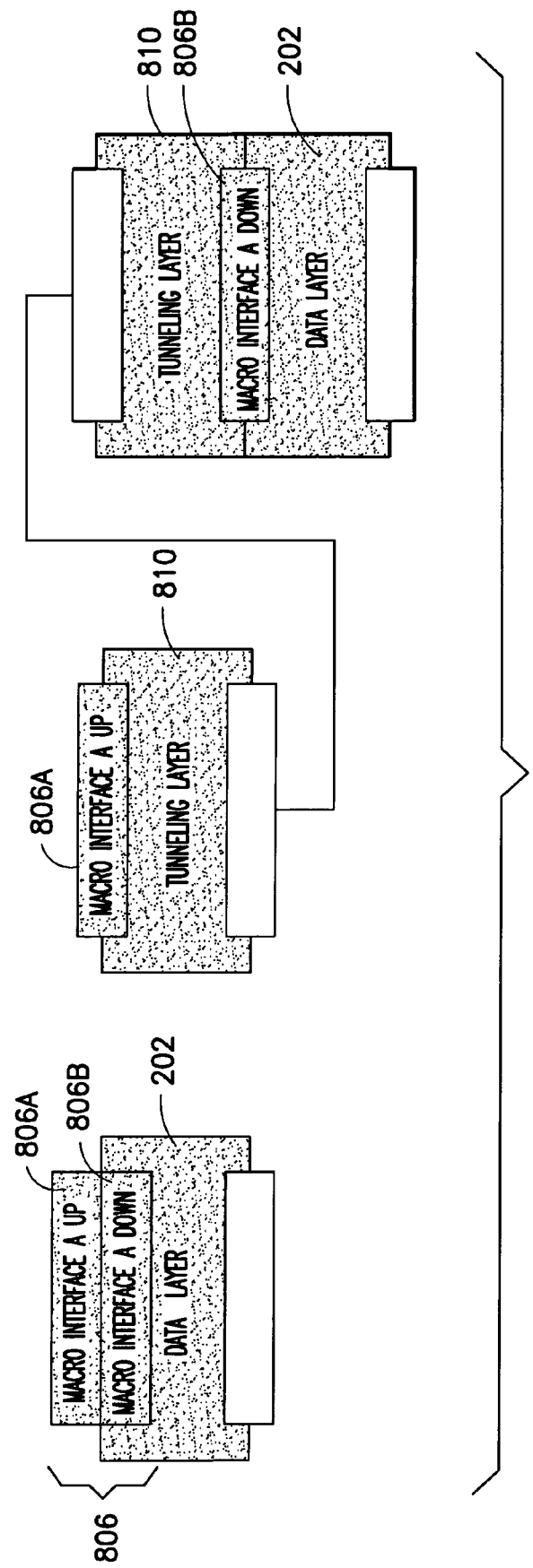

FIG. 12 illustrates certain details of the macro interface when tunneling. When considering in more detail how the macro commands are tunneled, it is useful to represent the macro interface (e.g., 806) as two blocks: macro interface up 806A (the portion directly coupled to the upper layer), and macro interface down 806B (the portion of the interface directly coupled to the lower layer, such as the datalink layer 202). The tunneling operation may then be viewed simply as an encoding-decoding of the information transiting between the two parts of the macro interface, and any protocol layer can transport this encoded information from one point to another.

The concept of tunneling will be further explained in the context of the an example of the principles of tunneling the I²C protocol. One factor that makes the tunneling of the I²C protocol difficult is the presence of the acknowledge bit, as it imposes strict boundaries for the maximum latencies throughout the entire system, as well as a multi-mastering possibility, as it forces inter-Hub 1300 communications to occur, as well as requiring a presence of a clock synchronizing mechanism.

For the case of mono-master I²C bus tunneling, where only one master is present on the bus, one may assume that the master is the engine 1150 of, as an example, a cellular telephone. This is a most straightforward way to tunnel I²C, as there are different alternatives to choose from. For example, one may use high-level tunneling, meaning that only macro commands are send through the MVHSS_Bus 200, and a I²C-compatible peripheral is located close to the I²C component. Alternatively, one may use low-level tunneling, which implies that the pin states of the I²C physical layer are sent through the MVHSS_Bus 200.

In general, the high-level tunneling is the simplest to perform, and implies only a constraint on the engine 1150 side of the transaction. One constraint is that the access to the I²C bus is performed either with a non-blocking mechanism, or with a blocking mechanism with a timeout.

For the case of multi-master I²C bus tunneling, there may be one or more microcontrollers present on the I²C bus. In this case it is generally not possible to use high-level tunneling of I²C since simple microcontrollers use I²C directly at a very low-level, i.e., very close to the hardware. Without software compatibility issues, the only alternative is to broadcast through the MVHSS_Bus 200 the state of the pins of every I²C master to every master. One may then simulate and model a multi-master I²C bus having long electrical lines, to account for the added latencies in the system. Of course, there may be constraints on the tolerable latencies, which can complicate tunneling, for example, the I²C high speed (HS) mode (3.4 MHz clock) through the MVHSS_Bus 200 when using a low-level tunneling approach.

With regard now to the concept of a virtual I²C bus (see again FIG. 4*b*), it is noted that the manner in which I²C is transported on the MVHSS_Bus 200 is similar to a physical I²C bus with long cables, because of the added delays related to the tunneling. Thus, what is presented is a technique to simulate one or more physical I²C buses, resulting in the possibility to define virtual I²C buses.

In practice, this implies that several independent virtual I²C buses may exist on the same MVHSS_Bus 200 bus, a feature that is useful for, as one example, isolating an internal I²C bus that is tunneled in the MVHSS_Bus 200 to increase security.

It is noted that such virtual I²C buses are more readily implemented if the hybrid tunneling approach is used (see FIG. 11), as there need not be any strict timing requirements when using a gateway.

Reference can be made to the block diagram of FIG. 13 for showing an exemplary embodiment of a portable terminal 1500, such as cellular telephone, that is constructed with nodes interconnected by the MVHSS_Bus 200 described herein. The above-mentioned optional Hub 1300 is shown connecting a cellular mobile terminal (CMT) ASIC 1310 to a mass memory 1320 and to at least one external module 1330. The external module 1330 may comprise an accessory module, also referred to as a peripheral device such as, by way of example, a printer, or an external memory, or a music player, or any desired type of functionality that complements the functionality of the terminal 1500. A direct connection is made between the CMT ASIC 1310 and an Application Engine (APE) ASIC 1340, that in turn is connected via the MVHSS_Bus 200 to a display 1350 and a camera 1360. A touch panel 1370 is shown coupled to the APE 1340 via the display 1350 using a non-MVHSS_Bus interface, such as a legacy interface (e.g., I²C or SPI). Each of the MVHSS_Bus nodes 1300, 1310, 1320, 1330, 1340, 1350 and 1360 can be seen to include protocol stacks of varying complexity, and certain of the nodes (1300, 1310 and 1340) also include MVHSS_bus routing tables 1400 (see FIG. 7*b*).

Based on the foregoing description of the embodiments of this invention it can be appreciated that the MVHSS_Bus 200 can be used for implementing a circuit switched network using the frame 540 and channels 511, 512, 513 and 514, thereby providing a simple and robust Quality of Service (QoS) implementation. That is, the concept of the channels, frames and allocated bandwidth can be used to "emulate" a circuit switched system, which in turn may be employed to provide a "hard" QoS in the network.

Based on the foregoing description of the embodiments of this invention it can be further appreciated that the MVHSS_Bus 200 can be used to implement the QoS on a best-effort network protocol, such as a network using "wormhole routing", in a transparent way by reserving the usage of a given channel for the best-effort network, by leaving the other channels for a circuit switched network implementation.

In general, wormhole routing describes a property of a message passing system in which each part of a message is transmitted independently, and one part can be forwarded to the next node before the entire message has been received. All parts of a single message follow the same route. The independent parts of the message are typically small, e.g., one 32-bit word. This reduces the latency and the storage requirements on each node when compared with message switching where a node receives the entire message before it begins to forward the message to the next node. As an example, and with cut-through switching, wormhole routing is applied to packets in a packet switching system so that the forwarding of a packet begins as soon as its destination is known, and before the entire packet had arrived.

In accordance with this aspect of the invention, it is possible to remove some limitations of a network that uses wormhole routing by adding mechanisms to provide QoS to a wormhole network.

Preferably, one may dedicate at least one of the channels 511, 512, 513, 514 for the wormhole network, and the dedicated channel is then served as the best effort channel 543. This implies that no bandwidth need be allocated a priori to the dedicated channel, and instead only what bandwidth that remains after the other channels are allocated is allocated to the best-effort channel 543. In this manner, it can be appreciated that one may "tunnel" the wormhole network via the best effort channel 543, and in parallel one may use the other channels to implement, for example, a circuit switched-like network. The QoS of the best effort channel 543 is then established by the selected best-effort channel protocol, for example wormhole routing; bandwidth allocation QoS, low latency QoS, and so forth, can be achieved by the circuit switched-like network.

Note in this regard that the best-effort network protocol can be represented by a number of different protocols, including the wormhole routing protocol.

One may also provide a plurality of network layer 203 protocols in parallel on the same communication network. For example, one channel may be used for "SpaceWire", which uses wormhole routing, or for "RapidIO", or for some other protocol.

Further, since the channels 511, 512, 513, 514 can be used to "emulate" a circuit switched network, one may define sub-domains in the network using the same network protocol, or different network protocol(s). For example, one may determine that channel-0 511 is allocated for a sub-domain A where wormhole routing is used, and that channel-1 512 allocated is for a sub-domain B where wormhole routing is also used, where sub-domain A and B are completely isolated from each other, such as for security purposes; and that channel-2 513 is allocated for a domain C that uses another network protocol, such as RapidIO. To create the sub-domains, one may simply configure in each node the channels that are allowed to be used. The implementation of these features of this invention is facilitated because the datalink layer 202 functions at least in part as a multiplexer, and may be viewed as many "logical networks" operated in parallel.

Relatedly, the embodiments of this invention assist in the evolution of a network, by replacing network protocols and making possible the transparent co-existence of different network protocols on the same communication network.

If desired, every node on the network may be setup and configured by a best-effort network protocol, such as a network that uses wormhole routing, to emulate a circuit switched network with a certain QoS.

Relatedly, the bandwidth allocation mechanism in the datalink layer 202 maybe be used to "simulate" a plurality of physical layers in parallel, each having a given bandwidth.

The foregoing description has provided by way of exemplary and non-limiting examples a full and informative description of the best method and apparatus presently contemplated by the inventors for carrying out the invention. However, and as should be realized based at least on the foregoing discussion of best effort routing, such as by using wormhole routing, and the related aspects of bandwidth allocation and so forth, various modifications and adaptations may become apparent to those skilled in the relevant arts in view of the foregoing description, when read in conjunction with the accompanying drawings and the appended claims. However, all such and similar modifications of the teachings of this invention will still fall within the scope of the embodiments of this invention.

Furthermore, some of the features of the preferred embodiments of this invention may be used to advantage without the corresponding use of other features. As such, the foregoing description should be considered as merely illustrative of the principles, teachings and embodiments of this invention, and not in limitation thereof.

What is claimed is:

1. An apparatus comprising:
   a communications bus; and
   a processor configured to implement a protocol stack comprising a datalink layer coupled to a physical layer, where the protocol stack operates with a protocol having frames, where each frame is comprised of a plurality of channels, where each channel is comprised of at least one token, where at least one channel of the plurality of channels is defined as a low latency channel for traffic having a low latency requirement, where said datalink layer is operable to intersperse at least one low latency channel token with tokens from at least one other channel to obtain a set of interspersed tokens, where the processor is further configured to transmit the set of interspersed tokens to another node via the communications bus.

2. An apparatus as in claim 1, where at least one channel of the plurality of channels is defined as a best effort channel, and where said datalink layer allocates an unused amount of frame bandwidth, if any, to the at least one best effort channel.

3. An apparatus as in claim 1, where each channel of said plurality of channels is comprised of a plurality of cells, and where cells from different ones of said channels can be transmitted so as to be temporally adjacent to one another.

4. An apparatus as in claim 2, where bandwidth allocation includes counting a number of bytes sent in a particular channel within a frame, and if the number of bytes at least equals the number of bytes allowed by a percentage of the total bytes in the frame that are assigned to assigned to the particular channel, no further data is sent on the particular channel during the frame.

5. An apparatus as in claim 1, where at least one channel of the plurality of channels is defined as a best effort channel, and where at least one channel of the plurality of channels is defined as a circuit-switched channel.

6. An apparatus as in claim 1, where more than one channel of the plurality of channels is defined as a best effort channel.

7. An apparatus as in claim 6, where the best effort channels are operated to emulate a circuit-switched network.

8. An apparatus as in claim 2, where said best effort channel is operated to implement wormhole routing.

9. An apparatus as in claim 1, where said communications bus is implemented in a system on a chip architecture operable to interconnect nodes within the system on a chip.

10. An apparatus as in claim 9, where said communications bus further interconnects at least one node external to the system on a chip.

11. An apparatus as in claim 2, where said protocol is independent of frame length.

12. An apparatus as in claim 1, where said protocol permits interconnection with at least one other type of bus by allowing tunneling of another protocol.

13. An apparatus as in claim 1, where a protocol compatibility rating is assigned to individual nodes connected to the communications bus for determining integrity of a corresponding bus network.

14. An apparatus as in claim 1, where nodes connected to the communications bus are hotpluggable, and further comprising a mechanism to discover identities of bus-connected nodes using a memory-read technique.

15. An apparatus as in claim 1, further comprising a mechanism to discover at least one of connection and synchronization states of nodes connected to the communications bus using a ping command that is transmitted to the communications bus.

16. An apparatus as in claim 1, where nodes connected to the communications bus are hotpluggable, and further comprising a mechanism to detect and recover from errors resulting from node connection and disconnection, and from a loss of synchronization due to a self-clocking nature of the communications bus.

17. An apparatus as in claim 1, said protocol stack further comprising a tunneling layer that is coupled to said datalink layer, said tunneling layer encapsulating traffic from another protocol within traffic of the protocol.

18. An apparatus as in claim 2, further comprising at least one routing table configured to store channel numbers as network node address information.

19. An apparatus as in claim 1, where nodes are connected to the communications bus and where one of said nodes comprises a cellular mobile terminal node.

20. An apparatus as in claim 19, where another one of said nodes comprises a Hub node that couples said cellular mobile terminal node to at least one further node.

21. A method comprising:
   implementing, by a processor, a protocol stack comprising a datalink layer coupled to a physical layer, where the protocol stack operates with a protocol having frames, where each frame is comprised of a plurality of channels, where each channel is comprised of at least one token, where at least one channel of the plurality of channels is defined as a low latency channel for traffic having a low latency requirement;

interspersing, by the processor, at least one low latency channel token with tokens from at least one other channel to obtain a set of interspersed tokens; and transmitting, by the processor, the set of interspersed tokens to another node via a communications bus.

22. A method as in claim 21, where at least one channel of the plurality of channels is defined as a best effort channel, the method further comprising: allocating an unused amount of frame bandwidth, if any, to the at least one best effort channel.

23. A method as in claim 21, where each channel of said plurality of channels is comprised of a plurality of cells, the method further comprising: transmitting cells from different ones of said channels so as to be temporally adjacent to one another.

24. A method as in claim 21, where the communications bus comprises a serial communications bus.

25. An apparatus comprising:

a communications bus;

means for implementing a protocol stack comprising a datalink layer coupled to a physical layer, where the protocol stack operates with a protocol having frames, where each frame is comprised of a plurality of channels, where each channel is comprised of at least one token, where at least one channel of the plurality of channels is defined as a low latency channel for traffic having a low latency requirement;

means for interspersing at least one low latency channel token with tokens from at least one other channel to obtain a set of interspersed tokens; and means for transmitting the set of interspersed tokens to another node via the communications bus.

26. An apparatus as in claim 25, where at least one channel of the plurality of channels is defined as a best effort channel, the apparatus further comprising: means for allocating an unused amount of frame bandwidth, if any, to the at least one best effort channel.

27. An apparatus as in claim 25, where said means for implementing is embodied in a system on a chip architecture operable to interconnect nodes within the system on a chip.

28. An apparatus as in claim 25, where the means for implementing, means for interspersing and means for transmitting comprise a processor or a microcontroller.

29. An apparatus as in claim 1, where the communications bus comprises a serial communications bus.

* * * * *